US011106862B2

(12) United States Patent
Curry et al.

(10) Patent No.: US 11,106,862 B2
(45) Date of Patent: Aug. 31, 2021

(54) COMBINING MODALITIES FOR COLLABORATING WHILE EDITING AND ANNOTATING FILES

(71) Applicant: Cisco Technology, Inc., San Jose, CA (US)

(72) Inventors: Stewart Curry, Dublin (IE); Andrew Henderson, Galway (IE); Keith Griffin, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 142 days.

(21) Appl. No.: 15/663,606

(22) Filed: Jul. 28, 2017

(65) Prior Publication Data

US 2019/0034395 A1 Jan. 31, 2019

(51) Int. Cl.
*G06F 40/166* (2020.01)
*H04L 12/58* (2006.01)
*G06F 9/451* (2018.01)
*G06Q 10/10* (2012.01)
*G06F 40/106* (2020.01)

(52) U.S. Cl.
CPC ............ *G06F 40/166* (2020.01); *G06F 9/452* (2018.02); *G06F 40/106* (2020.01); *G06Q 10/107* (2013.01); *H04L 51/04* (2013.01); *H04L 51/046* (2013.01)

(58) Field of Classification Search
CPC .......... G06F 3/048; G06F 17/24; G06F 9/452; G06F 17/212; H04L 51/046
See application file for complete search history.

(56) References Cited

U.S. PATENT DOCUMENTS

| | | | | |
|---|---|---|---|---|
| 9,372,858 B1* | 6/2016 | Vagell | .................. | G06F 40/253 |
| 9,396,279 B1* | 7/2016 | O'Donnell | ............ | G06F 40/169 |
| 9,483,753 B2* | 11/2016 | Thiruvidam | ........... | G06Q 10/10 |
| 9,519,886 B2* | 12/2016 | Berger | ................ | G06Q 10/101 |
| 2004/0085354 A1* | 5/2004 | Massand | ............. | G06F 17/2229 |
| | | | | 715/751 |
| 2012/0284618 A1* | 11/2012 | Bailor | ................... | G06F 17/241 |
| | | | | 715/255 |
| 2013/0191720 A1* | 7/2013 | Simons | ............. | G06F 17/30882 |
| | | | | 715/234 |
| 2013/0346885 A1* | 12/2013 | Singh | ...................... | H04L 51/04 |
| | | | | 715/758 |
| 2014/0310613 A1* | 10/2014 | Megiddo | ............... | H04L 65/403 |
| | | | | 715/753 |
| 2015/0113390 A1* | 4/2015 | Vagell | ..................... | G06F 17/24 |
| | | | | 715/255 |

(Continued)

*Primary Examiner* — Jeanette J Parker
(74) *Attorney, Agent, or Firm* — Merchant & Gould P.C.

(57) ABSTRACT

A communication system and related methods are described. The communication system includes a communication server computer and multiple user computers. The communication server computer maintains synchronization of multiple copies of a graphical user interface ("GUI") presented by the multiple user computers. The GUI implements a multi-user, digital communication environment and includes a chat area where communications are organized by time and a document editing area where communications are organized by subject. The GUI enables integration of the chat area and the document editing area and allows users to communicate across multiple communication modalities seamlessly and in real time.

25 Claims, 17 Drawing Sheets

(56) References Cited

U.S. PATENT DOCUMENTS

| | | | |
|---|---|---|---|
| 2015/0205510 A1* | 7/2015 | Hirakata | G06F 16/176 |
| | | | 715/748 |
| 2015/0304374 A1* | 10/2015 | Kotler | G06F 17/241 |
| | | | 715/753 |
| 2015/0339282 A1* | 11/2015 | Goyal | H04N 5/262 |
| | | | 715/229 |
| 2017/0147185 A1* | 5/2017 | Milvaney | G06F 17/241 |
| 2017/0147547 A1* | 5/2017 | Desai | G06F 17/241 |
| 2018/0189250 A1* | 7/2018 | Lee | G06F 9/45512 |

* cited by examiner

COMBINING MODALITIES FOR COLLABORATING WHILE EDITING AND ANNOTATING FILES

TECHNICAL FIELD

The present disclosure generally relates to digital communication including word processing and messaging, such as chat communication across networks. The disclosure relates more specifically to integrated display and processing of multiple different digital communication modalities, including chat and document editing, in the same computer user interface display.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Today, digital communication is prevalent, and multiple digital communication modalities, such as chat and collaborative document editing, allow multiple parties to communicate with one another in different forms and in real time. Different communication modalities tend to serve different purposes. For example, a chat room typically allows users to express themselves in free form and presents chat communications (e.g., messages) chronologically, while a collaborative document editing tool generally expects users to focus on specific ideas and presents document editing communications (e.g., edits or comments) by subject matter. Consequently, different communication modalities tend to be managed nearly independently with limited integration.

Further, this approach has the drawbacks that participants cannot communicate or collaborate seamlessly through different communication modalities. The form, content, or other aspects of the communications typically preclude cross-modality communication. In addition, determining the state of a document or chat conversation at a past point in time typically requires loading and viewing multiple different versions of documents individually, running comparisons, or extensive scrolling and human analysis, all of which are time-consuming and inefficient in use of computer resources.

DETAILED DESCRIPTION

Figure 1:
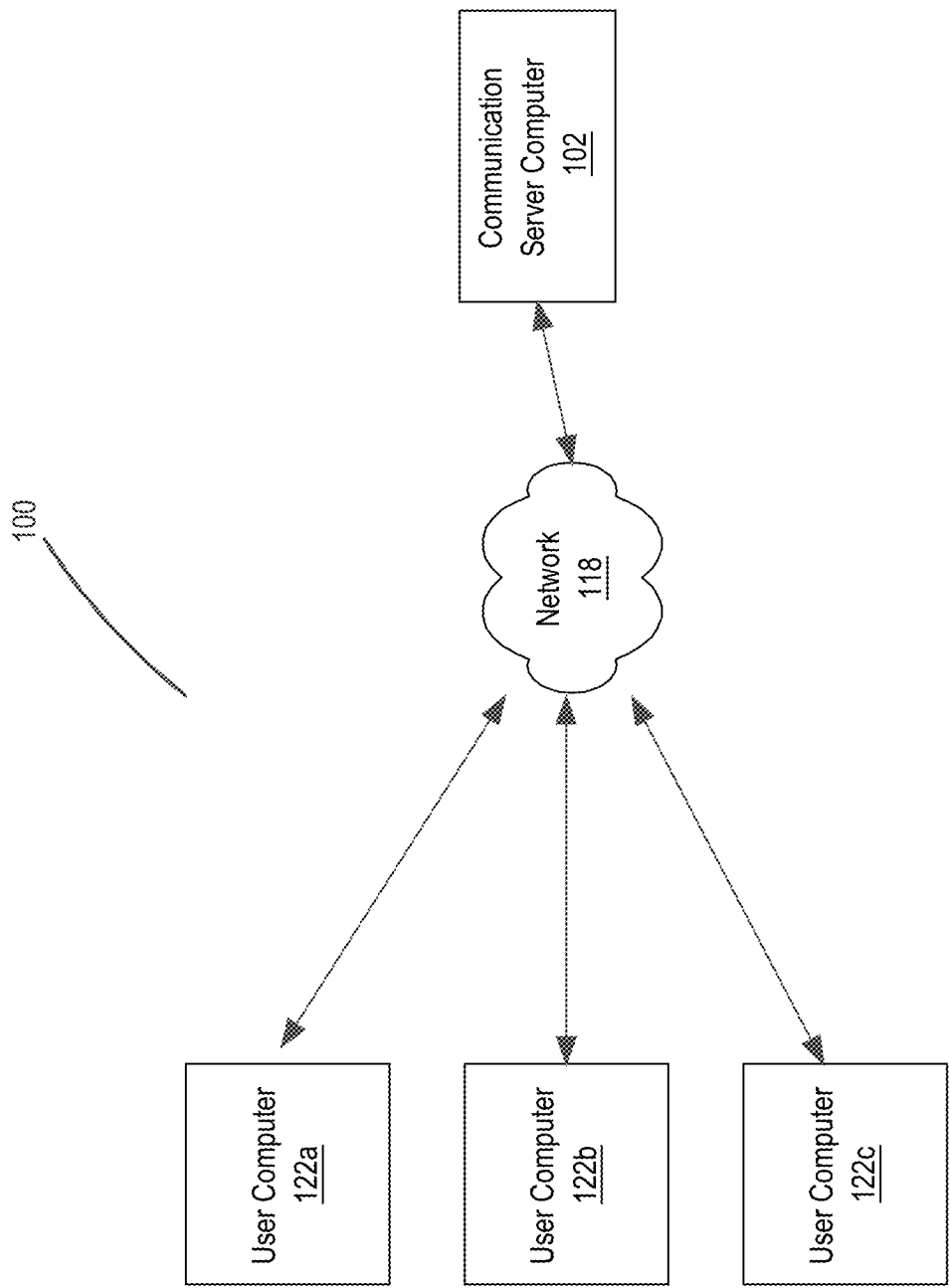
FIG. 1 illustrates an example networked computer system in which various embodiments may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described in sections below according to the following outline:
GENERAL OVERVIEW
EXAMPLE COMPUTING ENVIRONMENT
EXAMPLE SYSTEMS AND METHODS
IMPLEMENTATION EXAMPLE—HARDWARE OVERVIEW
OTHER ASPECTS OF DISCLOSURE General Overview This disclosure relates to a communication system and related methods that offer a multi-user, digital communication environment that integrates multiple communication modalities. In some embodiments, the communication system includes a communication server computer ("server" for short) and one or more user computers. The server generates, under program control, instructions for rendering a graphical user interface (GUI) at multiple user computers to enable multiple users to communicate through multiple communication modalities seamlessly depending on the form, nature, or other aspects of the communications. The server can synchronize the presentation of the multiple copies of the GUI and the corresponding data processing among the multiple user computers. The GUI can include a chat area that manages chat communications, such as chat messages, and a document editing area that manages document editing communications, such as edits to or comments on a document.

Furthermore, the GUI can allow the two areas to be integrated. As one example, an image included in a chat message can be directly copied to the document editing area through a drag-and-drop operation. As another example, metadata for a document edit, such as the time or the author of the edit, can be immediately displayed in the chat area. By virtue of these features, the same idea or action can be communicated in different manners—informal discussions in the chat area or formal descriptions in the document editing area, a full description in the document editing area or a summary in the chat area, etc.

In addition, the server or each of the user computers can track all the communications that occur to each copy of the GUI and enable versioning of the state of communication in the multi-user, digital communication environment. The communication system can therefore accept a request through a copy of the GUI for an earlier state of the communication corresponding to a past point in time and display that state of communication in the chat area and the document editing area of that copy of the GUI. For example, the past point in time may be when a particular communication was first entered into the chat area of one of the copies of the GUI, and a user can select an indicator displayed in association with that communication in another copy of the GUI to view the state of communication corresponding to the past point in time.

The communication system and related methods produce many technical benefits, as discussed throughout this application. First, the system allows users to communicate through multiple communication modalities depending on their needs or preferences. This feature enhances user productivity and convenience. Second, the system enables direct transfer of communication contents across different communication modalities and among a group of users in real time. This feature reduces data errors, which might occur when a user needs to transfer contents between two independent communication modalities manually or offline. This feature also increases collaboration efficiency as the transfer can be completed almost instantly to allow further communication.

Third, the system supports versioning of communication state over the entire digital communication environment. This feature allows users to study specific collaboration communications which might explain the formation of specific content or help improve future collaboration, thereby further improving collaboration efficiency. This feature also requires careful tracking of relationships among communications, thereby enabling better data organization and maintenance.

A computer-implemented method of combining multiple communication modalities in a multi-user, digital communication environment is disclosed. The computer-implemented method comprises causing, by a processor of a server, to be launched by a plurality of user computers a respective plurality of copies of a graphical user interface (GUI), including a first of the plurality of copies presented by a first of the plurality of computers. Additionally or alternatively, the server may programmatically generate instructions that are transmitted to the user computers and locally rendered to result in presenting the GUI at the user computers.

In an embodiment, the GUI comprises a plurality of areas, panels or regions corresponding to a plurality of communication modalities, including one chat area where communications are organized substantially chronologically and one document editing area associated with a document where communications are organized substantially by subject.

The computer-implemented method further comprises receiving, by the processor, a first item provided by a first user through the document editing area of the first copy from the first user computer over a first communication network. Furthermore, the computer-implemented method comprises causing to be displayed in real time metadata related to the first item in the chat area of each of the plurality of copies of the GUI.

A computer-implemented method of combining multiple communication modalities in a multi-user, digital communication environment is disclosed. The computer-implemented method comprises receiving, by a processor, a set of instructions from a remote server over a communication network for presenting a graphical user interface (GUI). The GUI has a plurality of areas corresponding to a plurality of digital communication modalities, including one chat area where communications are organized substantially chronologically and one document editing area associated with a document where communications are organized substantially by subject. The computer-implemented method comprises launching a first copy of the GUI in accordance with the set of instructions. The computer-implemented method also comprises receiving, by the processor, a first item through the document editing area. Furthermore, the computer-implemented method comprises causing to be displayed in real time metadata related to the first item in the chat area.

Example Computing Environment

FIG. 1 illustrates an example networked computer system in which various embodiments may be practiced. FIG. 1 is shown in simplified, schematic format for purposes of illustrating a clear example and other embodiments may include additional or different elements.

In some embodiments, a computer network system 100 comprises a communication server computer ("server") 102 and one or more user computers 122, which are communicatively coupled directly or indirectly via one or more networks 118. The different components of the computer network system 100 can reside in the same or different computer network domains.

The server 102 broadly represents one or more computers, virtual computing instances, and/or instances of a server-based application that is programmed to host or execute functions of a communication server computer including but not limited to preparing and delivering instructions for presenting a GUI that integrates multiple communication modalities, receiving information regarding communications received from or displayed in a copy of the GUI from one user computer and propagating that information to additional user computers, or analyzing past communications to improve the GUI. The server 102 can comprise a server farm, a cloud computing platform, a parallel computer, or any other computing facility with sufficient computing power in data processing, data storage, and network communication for the above-described functions.

A user computer 122 may comprise a desktop computer, laptop computer, tablet computer, smartphone, wearable device, or any other type of computing device that is capable of proper communication with the server 102 as well as adequate local data presentation, processing, and storage.

The networks 118 may be implemented by any medium or mechanism that provides for the exchange of data between the various elements of FIG. 1. Examples of network 118 include, without limitation, one or more of a cellular network, communicatively coupled with a data connection to the computing devices over a cellular antenna, a near-field communication (NFC) network, a Local Area Network (LAN), a Wide Area Network (WAN), the Internet, a terrestrial or satellite link, etc.

In some embodiments, the server 102 can prepare and deliver a set of instructions to one or more user computers 122 for presenting a GUI that integrates multiple communication modalities, such as chat or document editing. Each user computer 122 can present a copy of the GUI to receive communications from a user and display those communications to the user. Each user computer 122 can also send these UI events to the server 102, which can then transmit information regarding the communications to the server 102, which could then propagate the information to the other user computers 122, so that other users can also view and respond to those communications.

Through the GUI, the server 102 and thus the user computers 122 can allow users to maintain communications across communication modalities, such as a first user inputting an image into the chat area of a first copy of the GUI and a second user directly copying that image from the chat area of a second copy of the GUI into the document editing area of the second copy, or a first user inputting a document edit into the document editing area of the first copy and a second user inputting an approval of the document edit in the chat area of the second copy. In addition, the server 102 and thus the user computers 122 can allow users to examine a prior state of communication in the multi-user, digital communication environment, such as the first user inputting a communication in the chat area of the first copy at a first point in time and a second user at a second point in time requests for the state of communication at the first point in time in the chat area of the second copy and is presented with the state of communication at the first point in time in the chat area and the document editing area of the second copy.

Example Systems and Methods

Figure 2:
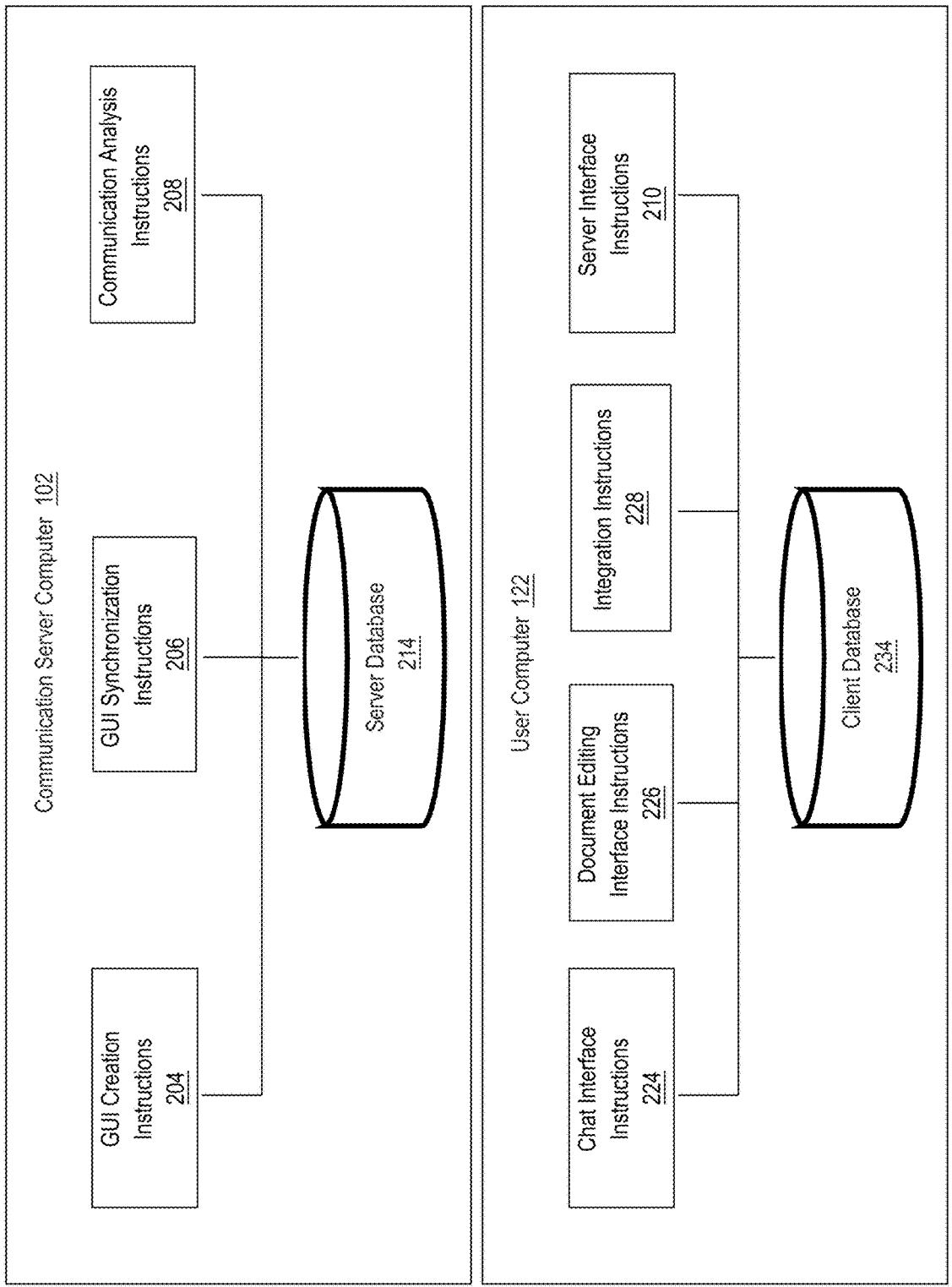
FIG. 2 illustrates example components of a server computer and of a user computer.

FIG. 2 illustrates example components of a server and of a user computer.

In some embodiments, the server 102 can comprise a GUI creation component 204, a GUI synchronization component 206, and a communication analysis component 208. The server 102 also can comprise one or more server databases 214. The user computer 122 can comprise a chat interface 224, a document editing interface 226, an integration component 228, and a server interface 220. The user computer 122 also can comprise one or more client databases 234. It will be appreciated that these diagrams are for illustration purposes only and the server 102 and the user computer 122 can comprise fewer or more functional or storage components. Each of the functional components can be implemented as software components, general or specific-purpose hardware components, firmware components, or any combination thereof. A storage component can be implemented using any of relational databases, object databases, flat file systems, or JSON stores. A storage component can be connected to the functional components locally or through the networks using programmatic calls, remote procedure call (RPC) facilities or a messaging bus. A component may or may not be self-contained. Depending upon implementation-specific or other considerations, the components may be centralized or distributed functionally or physically.

The GUI creation component 202 is programmed or configured with data structures and/or database records that are arranged to create a set of instructions for presenting a GUI for a multi-user, digital communication environment that integrates a chat area and a document editing area. The GUI synchronization component 2046 is programmed or configured to transmit the set of instructions to each of a plurality of user computers and enables synchronized presentation of multiple copies of the GUI and corresponding data processing by the plurality of user computers. This component can also be programmed to track all the chat communications received from the user computers that constitute a single chat stream and all the document editing communications received from the user computers that constitute a document in a database and handle requests for specific states of the communication in the multi-user, digital communication environment. The communication analysis component 206 is programmed or configured to analyze the communications received through the chat area and the document editing area of each copy of the GUI, and to update the GUI based on the analysis.

The server 102 interface 220 is programmed or configured with data structures and/or database records that are arranged to receive instructions for presenting the GUI from the server 102, launch a copy of the GUI, transmit to the server 102 information regarding the chat communications or document editing communications occurring to the copy of the GUI, and receive from the server 102 similar information occurring to other copies of the GUI. The chat interface 224 is programmed or configured to manage user interaction with the chat area of the copy of the GUI. This interface can also be programmed to track some or all of the communications that constitute the chat steam. The document editing interface 226 is programmed or configured to manage user interaction with the document editing area of the copy of the GUI. This interface can also be programmed to track some or all of the document editing communications that constitute the document. The integration component 228 is programmed or configured to facilitate integration of the chat area and the document editing area of the copy of the GUI. This component can also be programmed to handle requests for specific states of the communication in the multi-user, digital communication environments within the copy of the GUI.

In some embodiments, the server 102 is programmed or configured to manage a multi-user, digital communication environment. The server 102 is programmed to create a set of instructions for presenting a GUI that integrates multiple communication areas, including a chat area where communications are organized substantially by time and a document editing area where communications are organized substantially by subject. The set of instructions is then transmitted to each of multiple user computers over one or more communication networks to allow each user computer 122 to present a copy of the GUI.

In some embodiments, the chat area can allow a user to input chat messages and display chat messages inputted by the user and other users as a chat stream. The chat messages can be in any format and can include text, images, or other types of digital media. The chat messages would be displayed substantially by time and each chat message can be displayed together with a time when the chat message was inputted or other metadata, such as an identifier of the author of the chat message.

The chat area can also allow a user to input a chat message in response to an existing chat message and display the response chat message close to the existing chat message instead of at the end of the chat stream, thereby blending a relationship-based display structure into a time-based display structure. Furthermore, the chat stream can be recorded in a local memory together with relevant metadata, to enable tracking at least different versions of the chat stream corresponding to different points in time. For example, each chat message can be recorded with a date of input or an identifier of the author. Certain features of the chat area are described here only to illustrate examples, and additional features of existing chat rooms or similar models can also be incorporated into the implementation of the chat area.

The document editing area, which generally corresponds to a document, can allow a user to input edits to the document or comments on the document and can display document edits or comments inputted by the user and other users. The document can be stored in a local memory and edits would be incorporated into the document over time. Separate from the document, the document edits and the comments can be recorded together with relevant metadata, to enable tracking at least different versions of the document corresponding to different points in time. For example, each document edit or comment can be recorded with a date of input, an identifier of the author, or a type of entry (insertion, deletion, update, comment, etc.). Certain features of the document editing area are described here only to illustrate examples, and additional features of existing document collaboration tools or similar models can also be incorporated into the implementation of the document editing area.

In some embodiments, the GUI allows integration of the chat area and the document editing area. Specifically, a user can manage portions of the communications directly between the two areas. For example, a user may copy-and-paste or drag-and-drag a portion of a chat message, such as an image, directly into the document edit area as part of a document edit or comment, and vice versa, as further illustrated below. Furthermore, the GUI can support display of indicators in both the chat area and the document editing area to show correspondence between the communications in the two areas. For example, when a document edit or comment is incorporated into the document, the edit or comment would be displayed in the document editing area, and a chat message could be automatically generated and displayed in the chat area to indicate that the edit or comment has been incorporated into the document.

In some embodiments, other chat messages can be automatically generated and displayed to indicate other aspects of the communications in the document editing area, such as a request for an approval of the edit, an approval of the request, or an indication of a selection of document content for transfer or duplication or that a transfer or duplication of the document content into the chat area, as further illustrated below. Similarly, document edits or comments can be automatically generated and displayed in the document editing area in response to chat messages displayed in the chat area, as further discussed below.

In some embodiments, when a first communication in the first of the chat areas and document editing area was generated and displayed in response to a second communication displayed in the second of the two areas, the GUI can support display of a first indicator associated with the first communication in the first area and/or a second indicator associated with the second communication in the second area to show that the two communications correspond to each other. Each of the two indicators can be displayed constantly or upon a selection of the associated communication, the corresponding communication in the other area, or the other indicator in the other area. The indicators can also be merged into the communications. For example, instead of having to select a separate indicator, the user can simply select a particular chat message in the chat area in order to see a corresponding document edit or comment in the document editing area.

In some embodiments, the GUI can allow a user to specify a past point in time and view the state of communication in the multi-user, digital communication environment at or around that past point in time. The specification of time can be standalone or associated with a chat message in the chat stream or a document edit or comment in the document. As one example, the GUI can allow a user to specify a past point in time by choosing a menu option and then entering the time in a text field. As another example, the chat area can enable a chat message, a timestamp displayed in association with the chat message, or a separate indicator displayed in association with the chat message to be selectable, and the document editing area can similarly enable a document edit or comment, a timestamp displayed in association with the edit or comment, or a separate indicator displayed in association with the edit or comment to be selectable. Even when a timestamp is not selected, a selection of the communication or the associated indicator can be interpreted as specifying the time indicated by the timestamp.

In some embodiments, in response to the specification of a past point in time, the GUI can support display of the state of communication at or around that past point in time, which would typically include the chat messages and document edits or comments inputted up to the past point in time. For example, the GUI can support temporary display of the requested state of communication in the chat area and the document editing area and allow a switch back to the display of the current state of communication. Furthermore, the GUI can allow the user to selectively view the communications in the multi-user, digital communication environment subject to other filters, such as after a past point in time, during a past period in time, or associated with specific users or user computers. The GUI can also support display of indicators for corresponding communications in the two areas only in response to such requests for specific states of the communication.

In some embodiments, the GUI can further facilitate the integration of the chat area and the document editing area. The GUI can be trained to support understanding of basic natural-language request for manipulating communications between the two areas using existing natural language processing techniques known to someone of ordinary skill in the art. For example, the GUI can trigger processing of a user instruction in a chat message to replace all occurrences of the word "big" to "large" in the document. The GUI can also be trained to support learning from the communications and predict further communications. For example, after a user manually replace a few occurrences of the word "big" to "large" in the document, the GUI can support inquiring in a chat message whether the user would like to replace all the occurrences using existing pattern recognition techniques known to someone of ordinary skill in the art.

The GUI can also support automatically generating metadata for a communication that occurred to one of the two areas and displaying the metadata in the other area. For example, for a paragraph added to the document editing area, the GUI can support generating and displaying a summary of the paragraph in the chat area, or for an image included in a chat message, the GUI can support generating and displaying a title of the image in the chat area, using existing content summarization techniques known to someone of ordinary skill in the art. The GUI can also support enforcing specific rules over the integration of the two areas. Such rules could control access across the two areas, to permit only certain individuals to drag-and-drop portions of the communications from one of the two areas to the other, for instance. Such rules could also restrict communication across the two areas, to permit only certain individuals to chat about specific subject matter present in the document editing area.

In some embodiments, the server 102 is configured to maintain synchronization of the multiple copies of the GUI and the corresponding data processing. As discussed above, each user computer 122 would transmit to the server 102 information regarding communications occurring to their respective copies. Such information would generally include data that affects the chat stream of the document that is globally shared by the user computers, such as document edits inputted by a user or chat messages automatically generated by the GUI. Each user computer 122 would also receive similar information from the server 102 transmitted by other user computers.

For example, upon receiving a document edit by an authorized first user through the document editing area of a first copy of the GUI, the first user computer 122a can display the document edit as incorporated into the document in the document editing area of the first copy and generate and display a chat message reporting the incorporation of the document edit in the chat area of the first copy. The first computer 122a can also transmit information regarding these communications to the server 102 in real time, which can then forward the information to a second user computer 122b in real time. Based on the information, the second user computer 122b can duplicate the occurrence of the communications in a second copy of the GUI in real time, so that a user of the second user computer 122b can also view the document edit and the chat message as the first user did. Any GUI and data synchronization techniques known to someone in the art, such as those implemented by Java® or MatLab®, can be used to implement the synchronization of the presentation of multiple copies of the GUI and the corresponding data processing.

FIG. 3, FIG. 4, FIG. 5, FIG. 6, FIG. 7, FIG. 8, FIG. 9, FIG. 10, FIG. 11, FIG. 12, FIG. 13, FIG. 14 illustrate an example GUI for the multi-user, digital communication environment, a copy of which is presented by each of a plurality of user computers, as a series of digital communications occur, in one embodiment. Each diagram of a GUI example in this disclosure comprises an example of output that one or more computers may render in response to instructions from the server. The instructions may be in a markup language or programmatic calls to library functions that are executed either at the server or the other computers. The size of areas, regions or panels may vary in different embodiments and are not shown to scale, or in any particular format or arrangement that is required. Similarly, colors, borders, typefaces and other graphical elements may be different in other embodiments and may be specified using configuration data, parameters of calls, or in the instructions.

Figure 3:
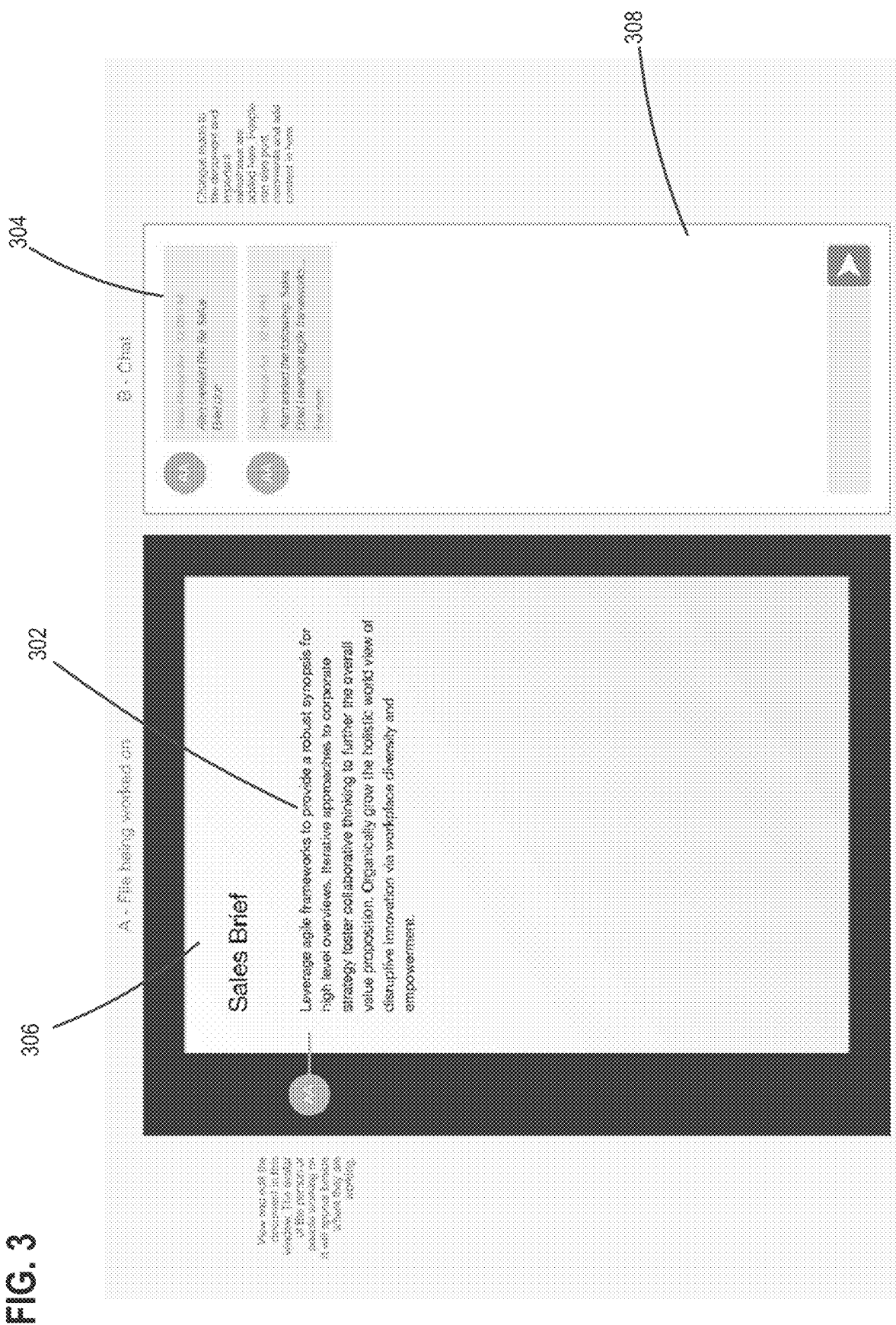
FIG. 3 illustrates an example graphical user interface (GUI) display, which may be rendered programmatically using program implementation of the methods described herein, and where in response to content added to the document editing area, a user computer displays a status update regarding the addition in the chat area.

FIG. 3 illustrates an example GUI where in response to content added to the document editing area, a user computer 122 displays a status update regarding the addition in the chat area. Specifically, the user AA can be the main author or owner of a document to which the document editing area 306 corresponds. The user AA can add the paragraph 302 into the document editing area 306, and a chat message 304 can be automatically generated and displayed in the chat area 308 to inform each user interacting with a copy of the GUI of the addition. The chat message can include the time of the addition and the author of the addition, or other related metadata.

Figure 4:
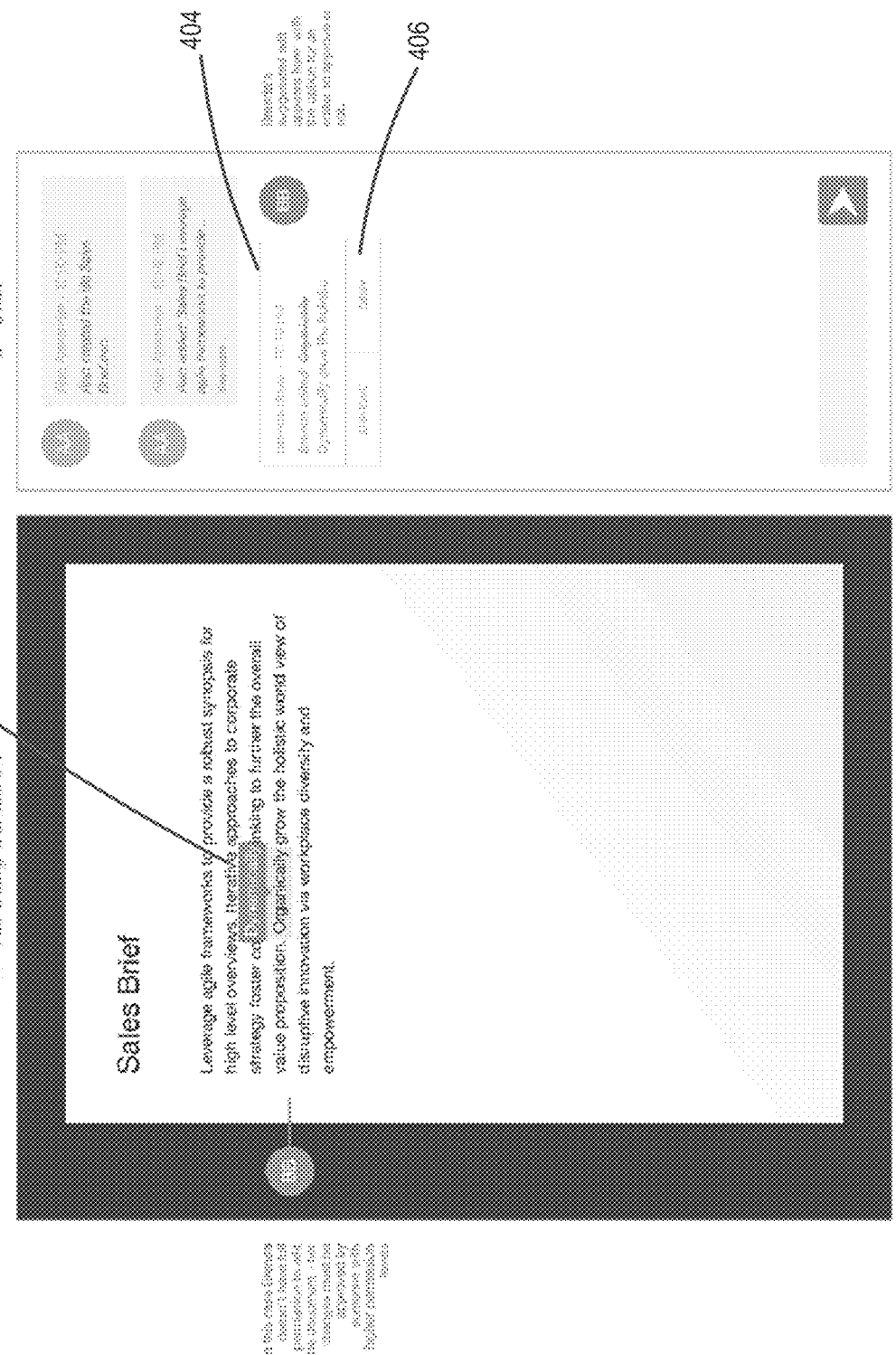
FIG. 4 illustrates an example GUI where in response to an attempt to incorporate an update in the document editing area, a user computer displays a request for authorization of the update in the chat area.

FIG. 4 illustrates an example GUI where in response to an attempt to incorporate an update in the document editing area 306, a user computer 122 displays a request for authorization of the update in the chat area 308. Specifically, the user BB can suggest a replacement of the word "Organically" by "Dynamically" in the document editing area 306. The user computer 122 can display a status update regarding the suggestion 404 as well as a request to authorize the update 406 in the chat area 308. Before the update is authorized, the user computer 122 can also display both the original word and/or the suggested replacement in a stacked manner 402 or in various other forms. For example, the user computer 122 can display the replacement in a special font or color and display the original word below the replacement as shown in the figure only when a user uses a cursor control device to hover a cursor over the replacement. Furthermore, another user, such as the user AA, can respond to the request for approval, by selecting the "approve" portion of the request 406, for example.

Figure 5:
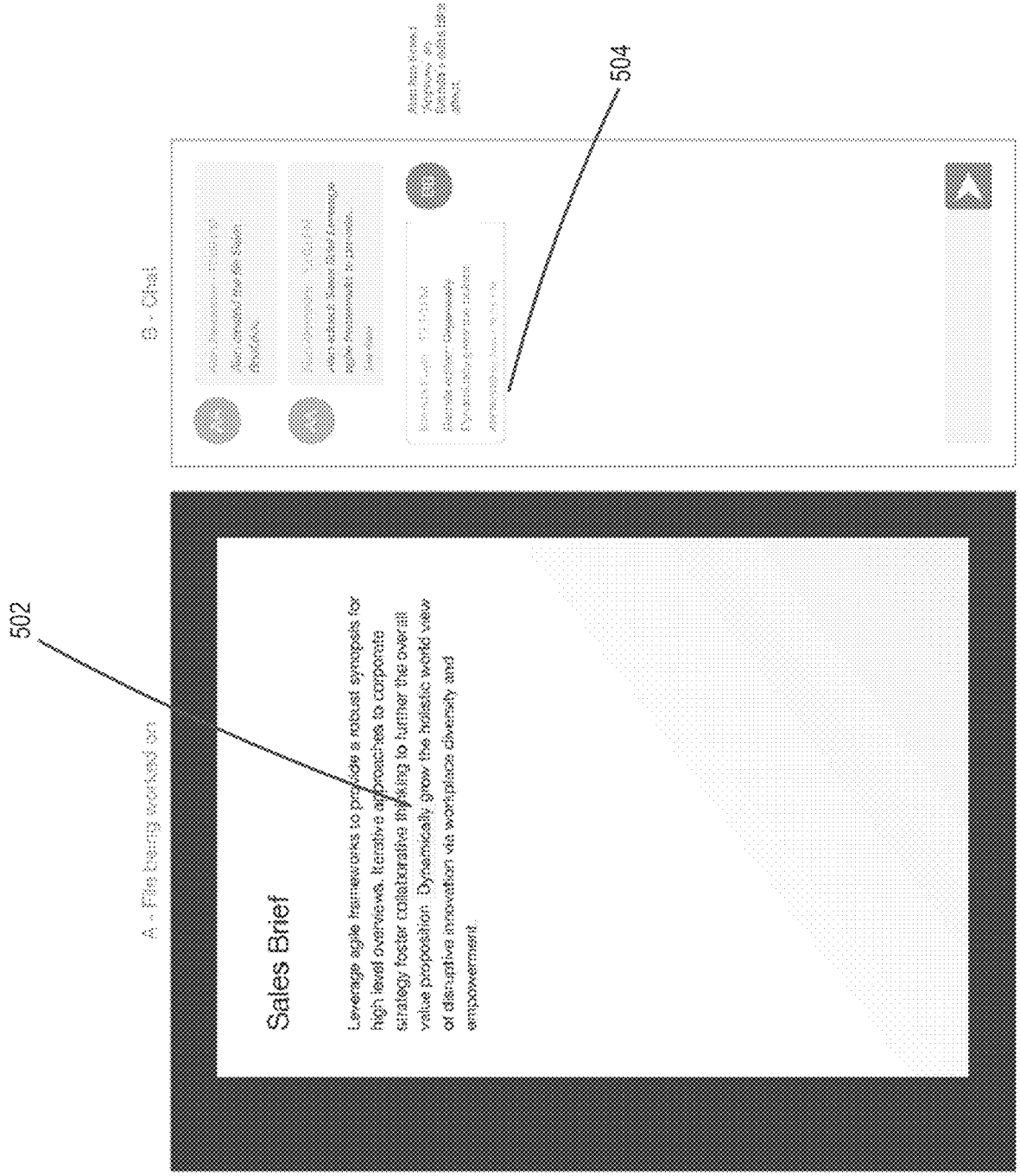
FIG. 5 illustrates an example GUI where in response to an approval of a suggested edit in the document editing area, the user computer displays a status update of the approval.

FIG. 5 illustrates an example GUI where in response to an approval of a suggested edit in the document editing area 306, the user computer 122 displays a status update of the approval. Specifically, after an authorized user approves the request, the user computer 122 can show a status update regarding the approval 504 in the chat area 308. The user computer 122 can also finalize the edit by showing only the word "Dynamically" 502 in a normal font and color in the document editing area 306.

Figure 6:
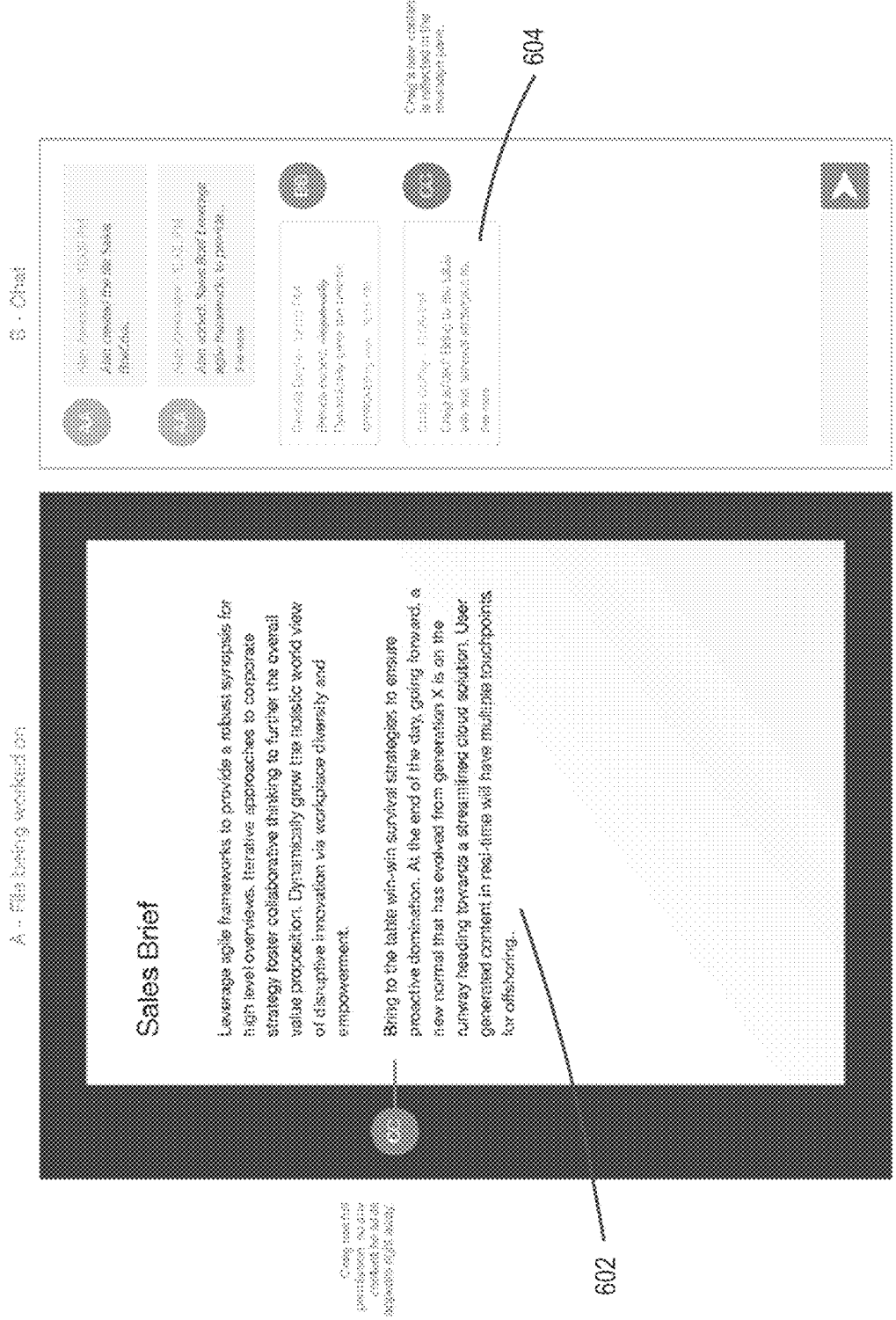
FIG. 6 illustrates an example GUI that is similar to the GUI illustrated in FIG. 1.

FIG. 6 illustrates an example GUI that is similar to the GUI illustrated in FIG. 1. In this case, it can be the user CC who is adding a paragraph to the document editing area 306. Because the user CC has permission or authorization to perform the addition, the user computer 122 can directly incorporate the suggested edit 602 in the document editing area 306 and display a status update regarding the document edit 604 in the chat area 308.

Figure 7:
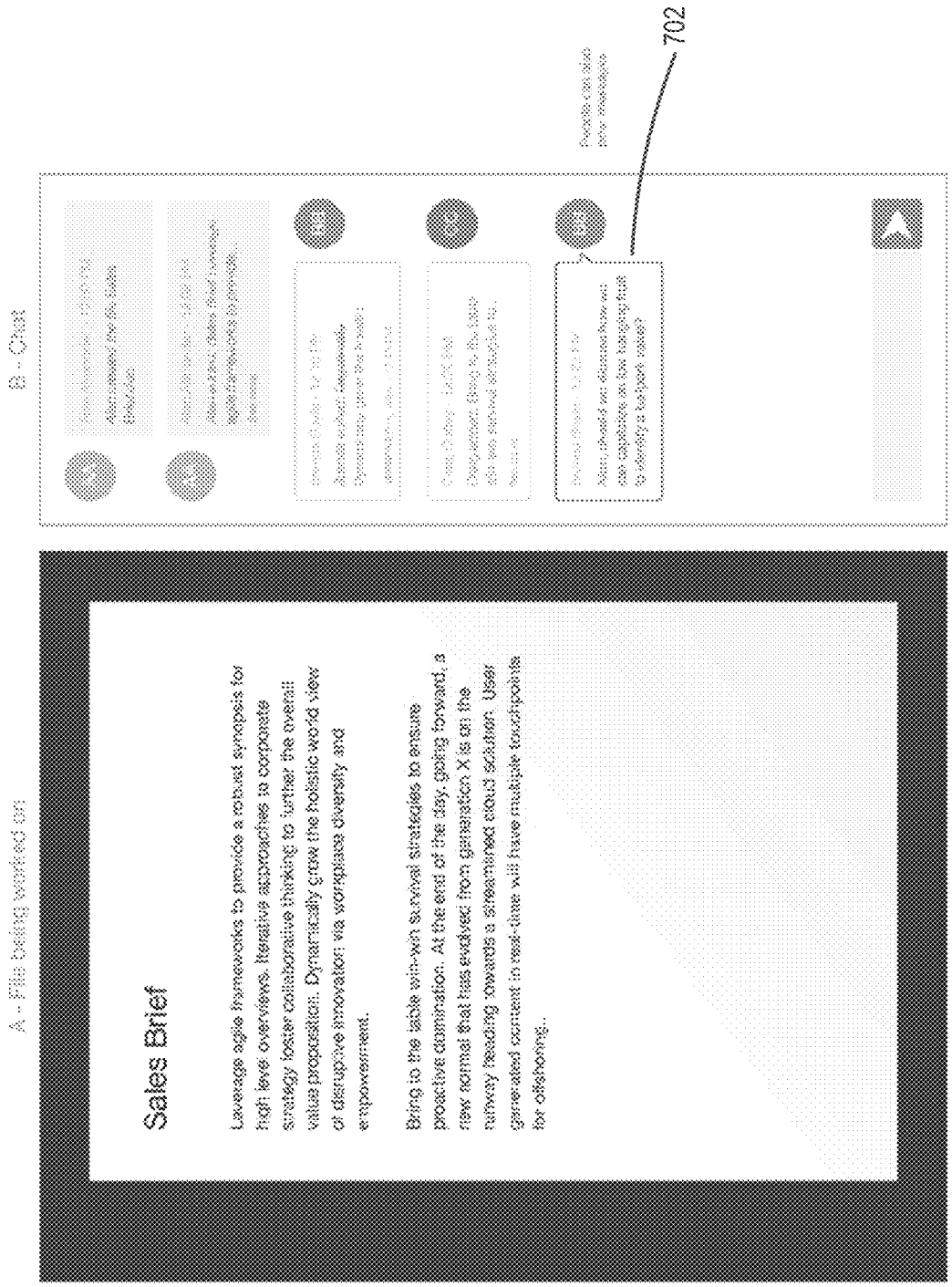
FIG. 7 illustrates an example GUI where a user inputs a chat message in the chat area.
Figure 8:
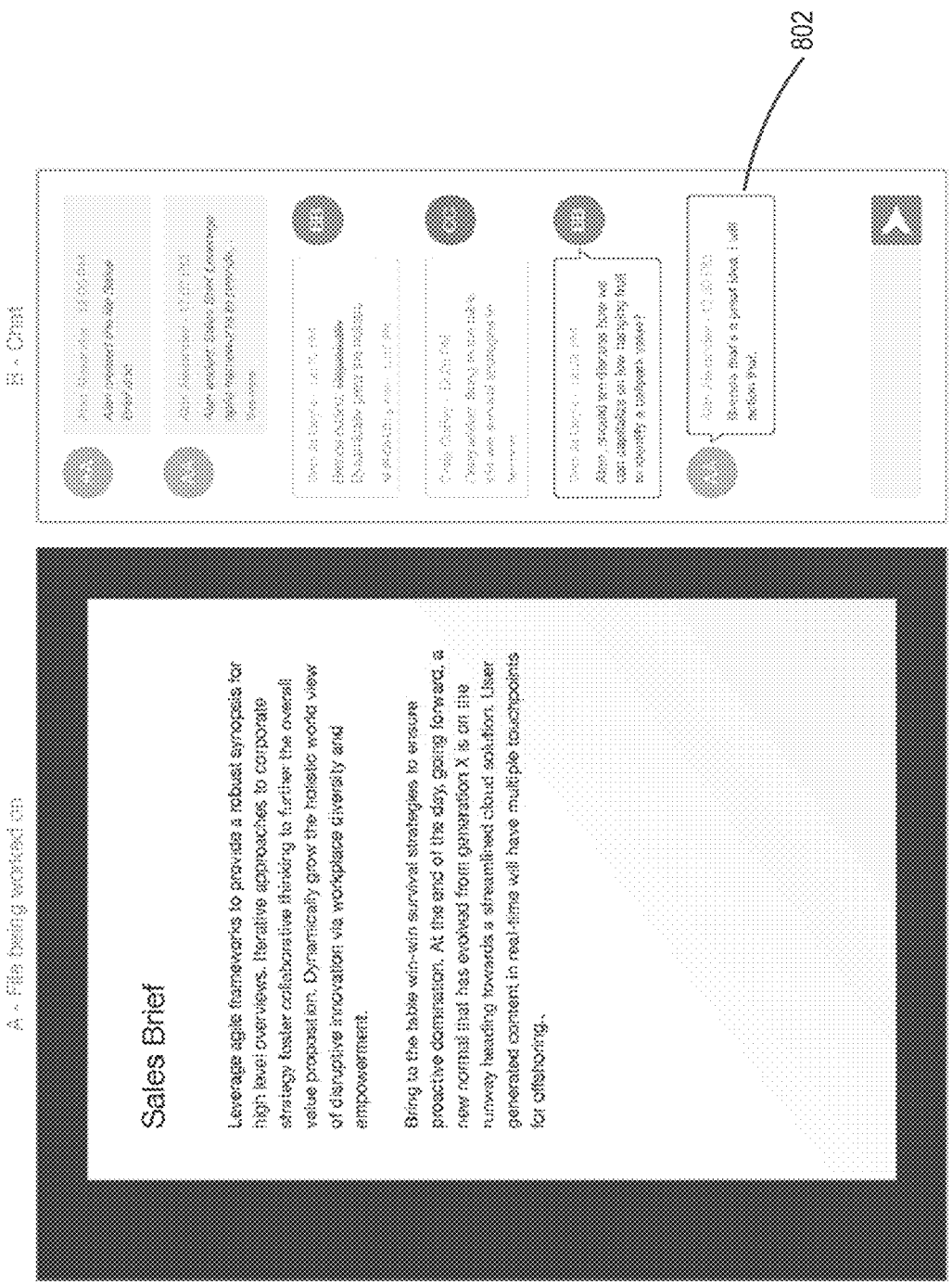
FIG. 8 illustrates an example GUI where another user inputs a reply chat message in the chat area.
Figure 9:
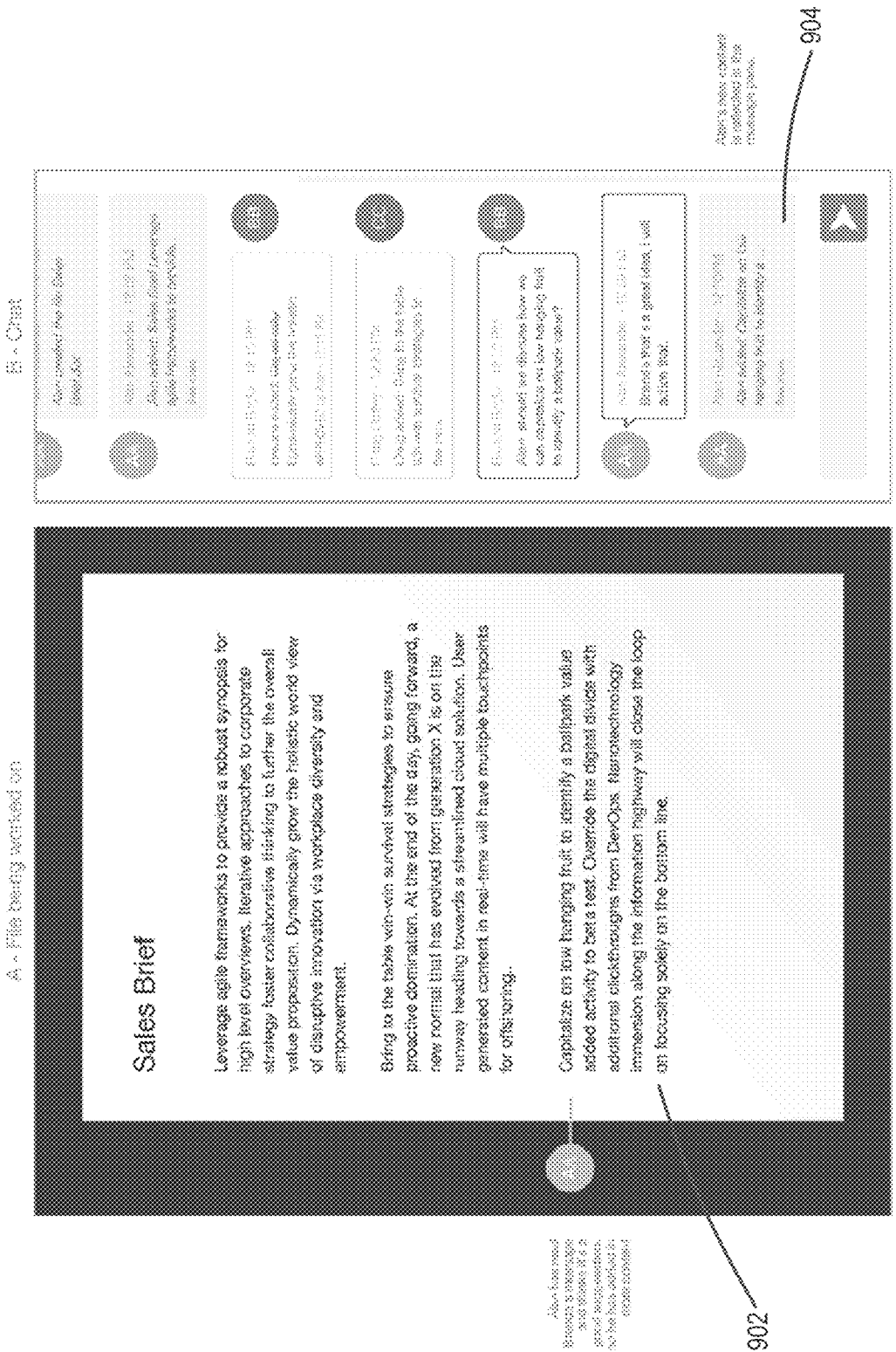
FIG. 9 illustrates an example GUI that is similar to the GUI illustrated in FIG. 3.
Figure 10:
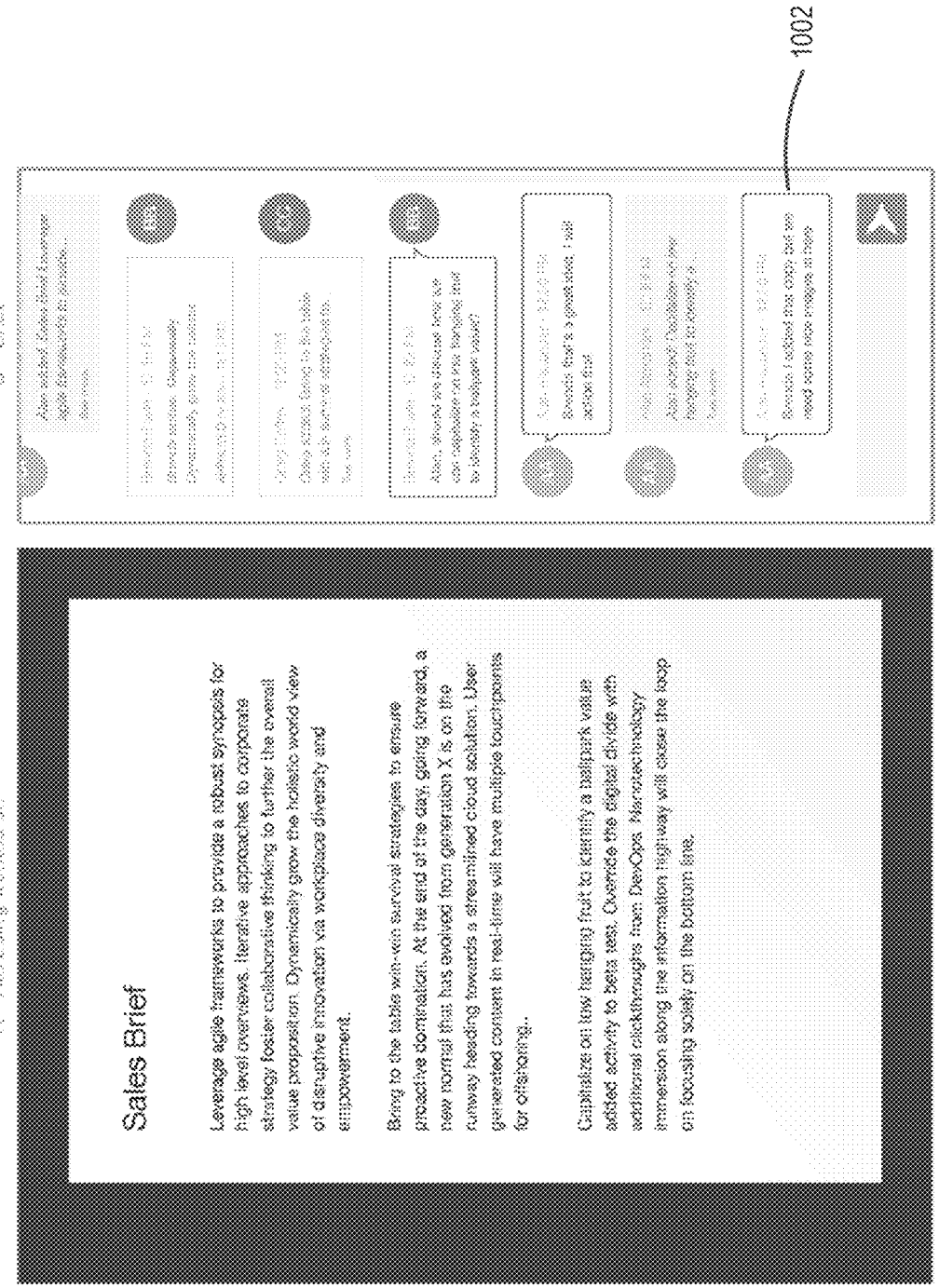
FIG. 10 illustrates an example GUI that is similar to the GUI illustrated in FIG. 7.

FIG. 7 illustrates an example GUI where a user inputs a chat message in the chat area 308. Specifically, a chat message 702 inputted by the user BB can be displayed in the chat area 308. FIG. 8 illustrates an example GUI where another user inputs a reply chat message in the chat area 308. Specifically, a reply chat message 802 inputted by the user AA can be displayed in the chat area 308. FIG. 9 illustrates an example GUI that is similar to the GUI illustrated in FIG. 3. In this case, a paragraph 902 added by the user AA can be displayed in the document editing area 306, and the user computer 122 can display a status update regarding the addition 904 in the chat area 308. FIG. 10 illustrates an example GUI that is similar to the GUI illustrated in FIG. 7. Specifically, a chat message 1002 inputted by the user AA can be displayed in the chat area 308.

Figure 11:
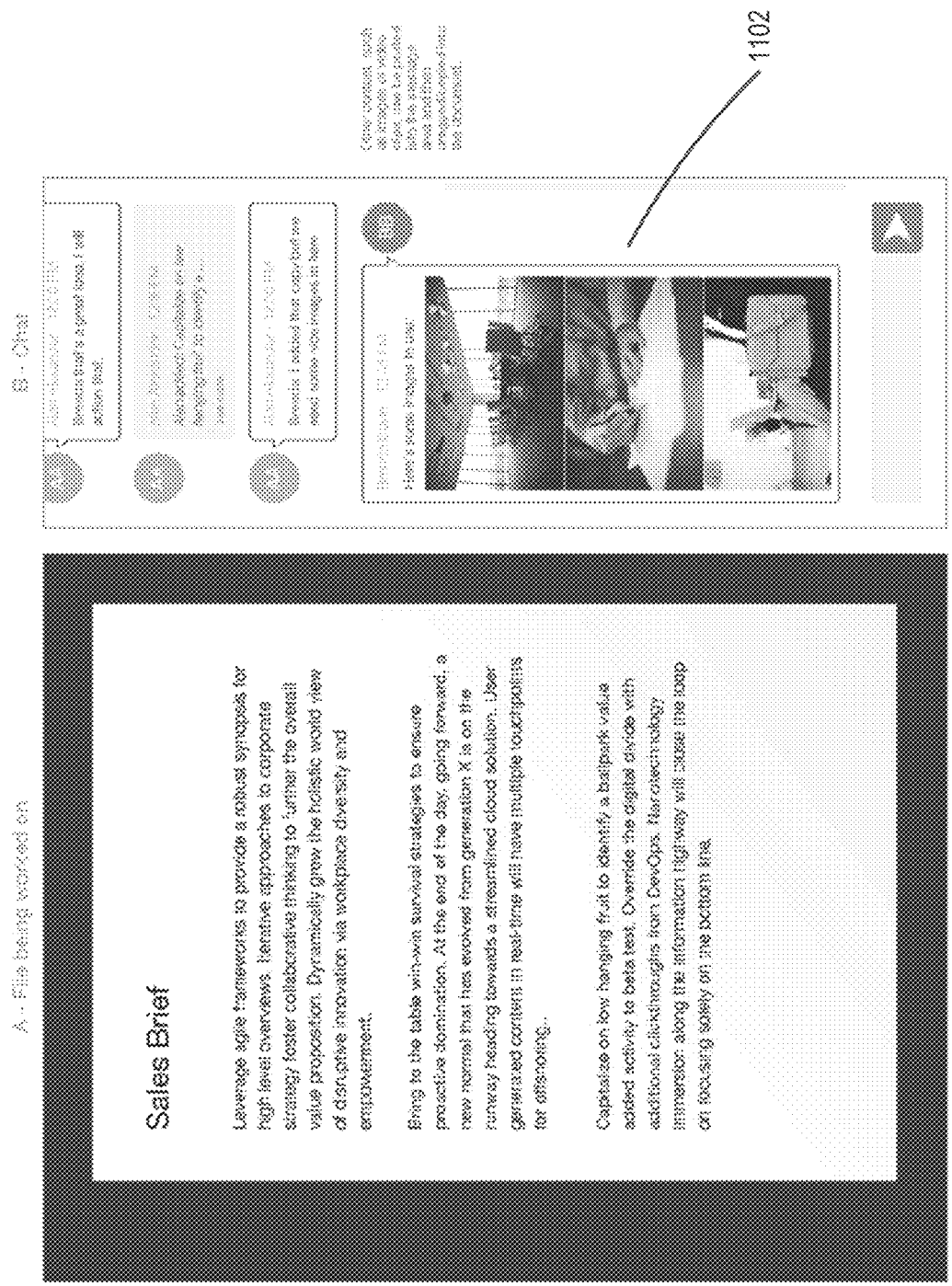
FIG. 11 illustrates an example GUI where a user inputs a chat message including images in the chat area.
Figure 12:
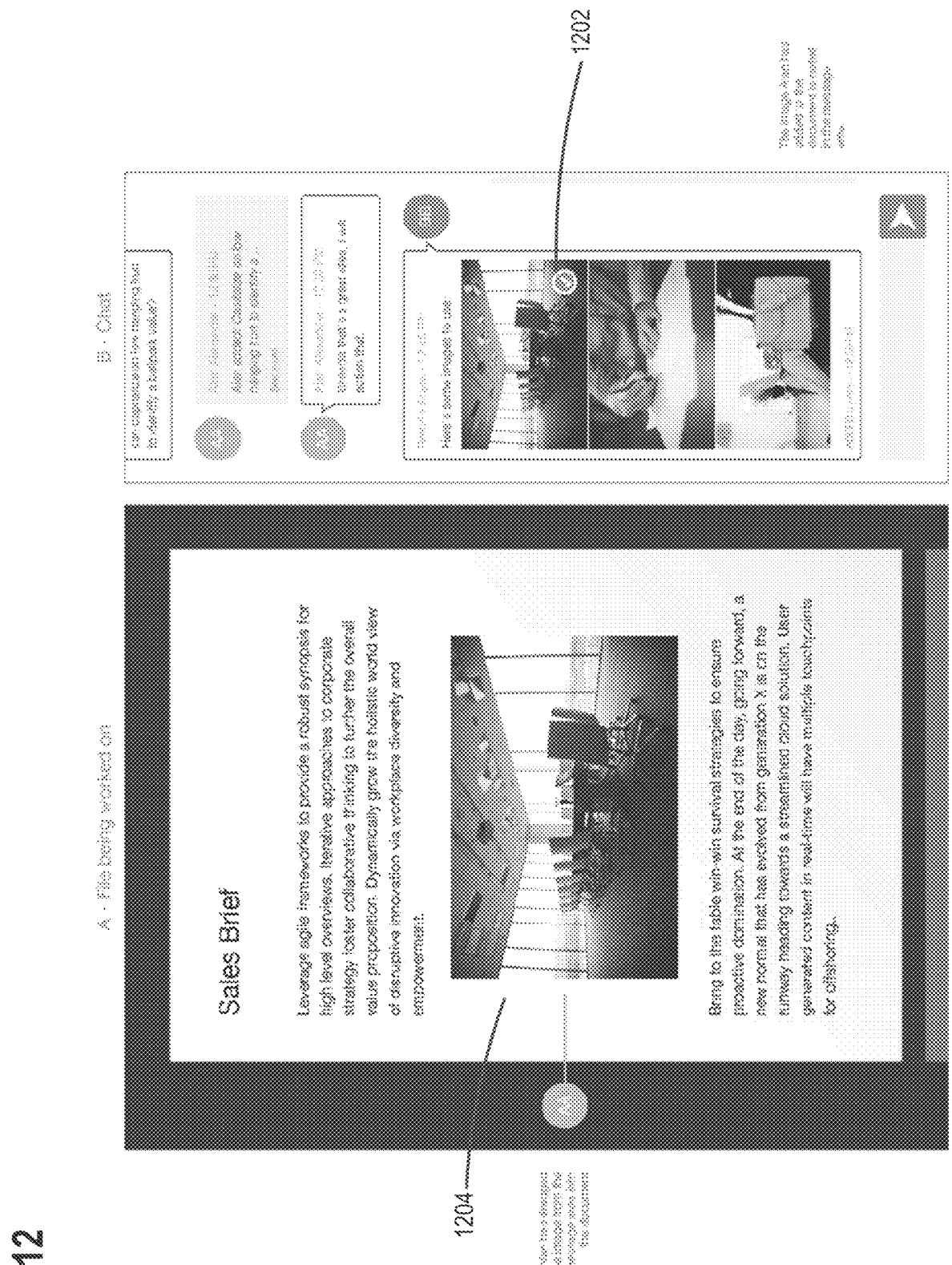
FIG. 12 illustrates an example GUI where in response to an operation to transfer communication content from the chat area to the document editing area, the user computer displays the content in the document editing area in real time.

FIG. 11 illustrates an example GUI where a user inputs a chat message including images in the chat area 308. Specifically, a chat message 1102 including three images by the user BB can be displayed in the chat area 308. FIG. 12 illustrates an example GUI where in response to an operation to transfer communication content from the chat area 308 to the document editing area 306, the user computer 122 displays the content in the document editing area 306 in real time. Specifically, the user AA can drag-and-drop or copy-and-paste the first of the three images in the chat message 1102 into the document editing area 306. The user computer 122 can then display that image 1204 in the documenting editing area. The user computer 122 can also display an indicator 1202 in the chat area 308 that the image has been transferred into the document editing area 306, such as the checkmark.

Figure 13:
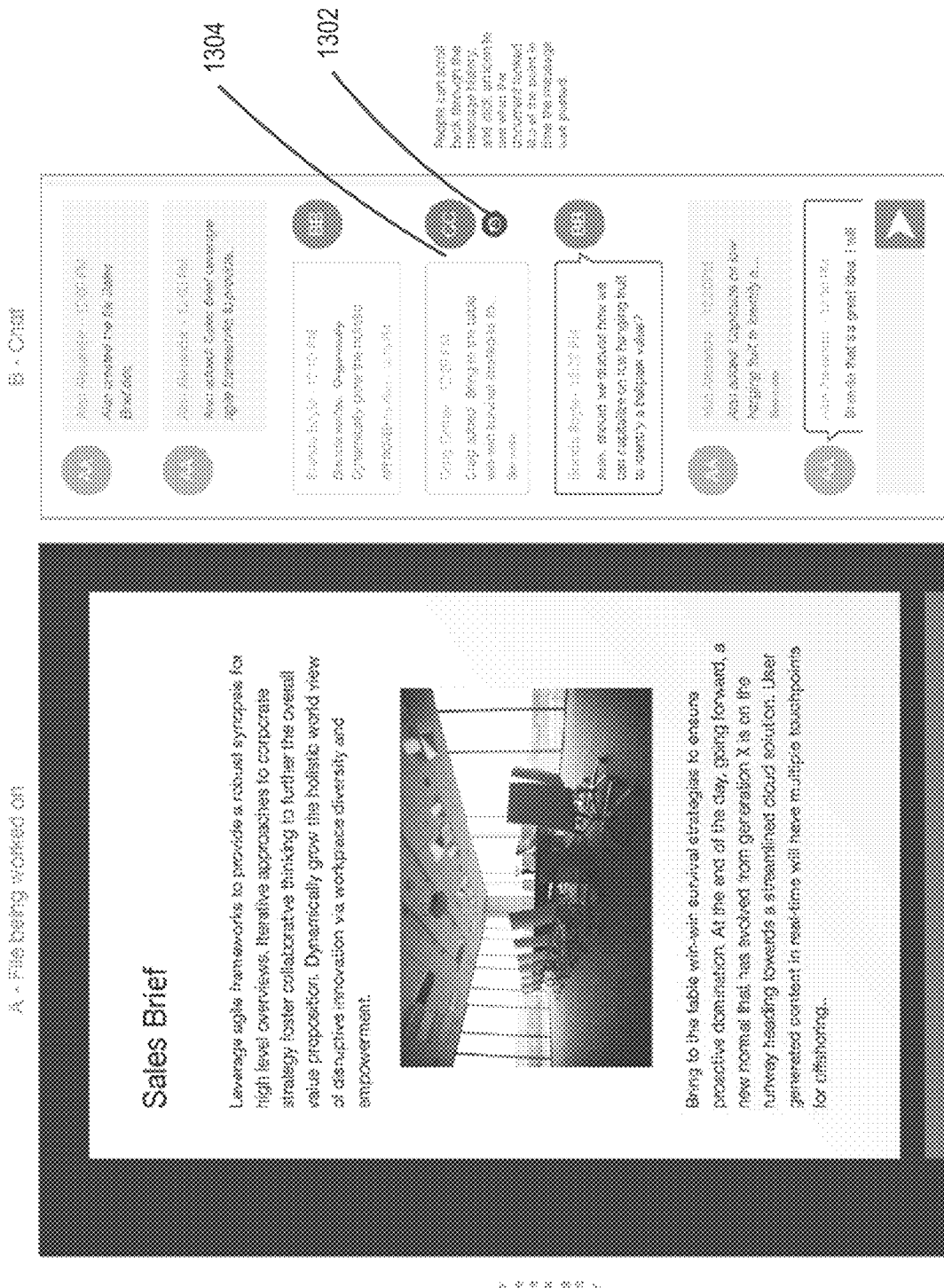
FIG. 13 illustrates an example GUI that allows a user to examine a state of communication corresponding a past point in time in the multi-user, digital communication environment.
Figure 14:
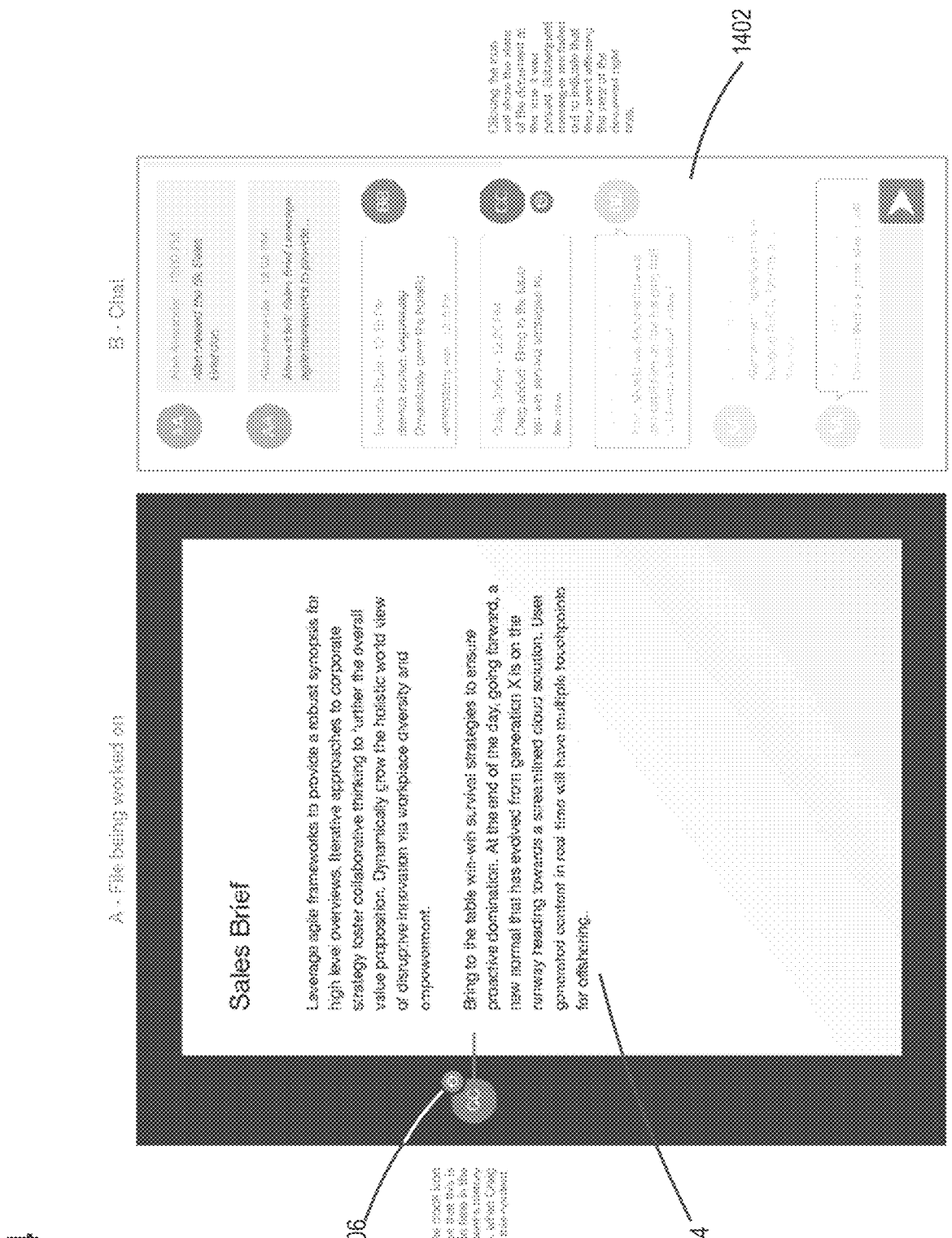
FIG. 14 illustrates an example GUI that allows a user to examine a state of communication corresponding a past point in time.

FIG. 13 illustrates an example GUI that allows a user to examine a state of communication corresponding to a past point in time in the multi-user, digital communication environment. FIG. 14 similarly illustrates an example GUI that allows a user to examine a state of communication corresponding to a past point in time. Specifically, the user computer 122 can display an indicator 1302 next to a chat message 1304. When a user selects the indicator, the user can view the state of communication in the chat area 308 and in the document editing area 306 at or near the past point in time associated with the chat message, as illustrated in FIG. 14. The chat messages received after the past point in time 1402 can be grayed out or hidden. In this case, the chat message had been automatically generated in response to an addition of a paragraph 1404 in the document editing area 306. Therefore, the user computer 122 can further display an indicator 1406 next to that paragraph 1404 along with relevant metadata that the paragraph 1404 corresponds to the chat message 1304 and would represent the communication that occurred to the document editing area 306 up to the past point in time.

Example Processes

Figure 15:
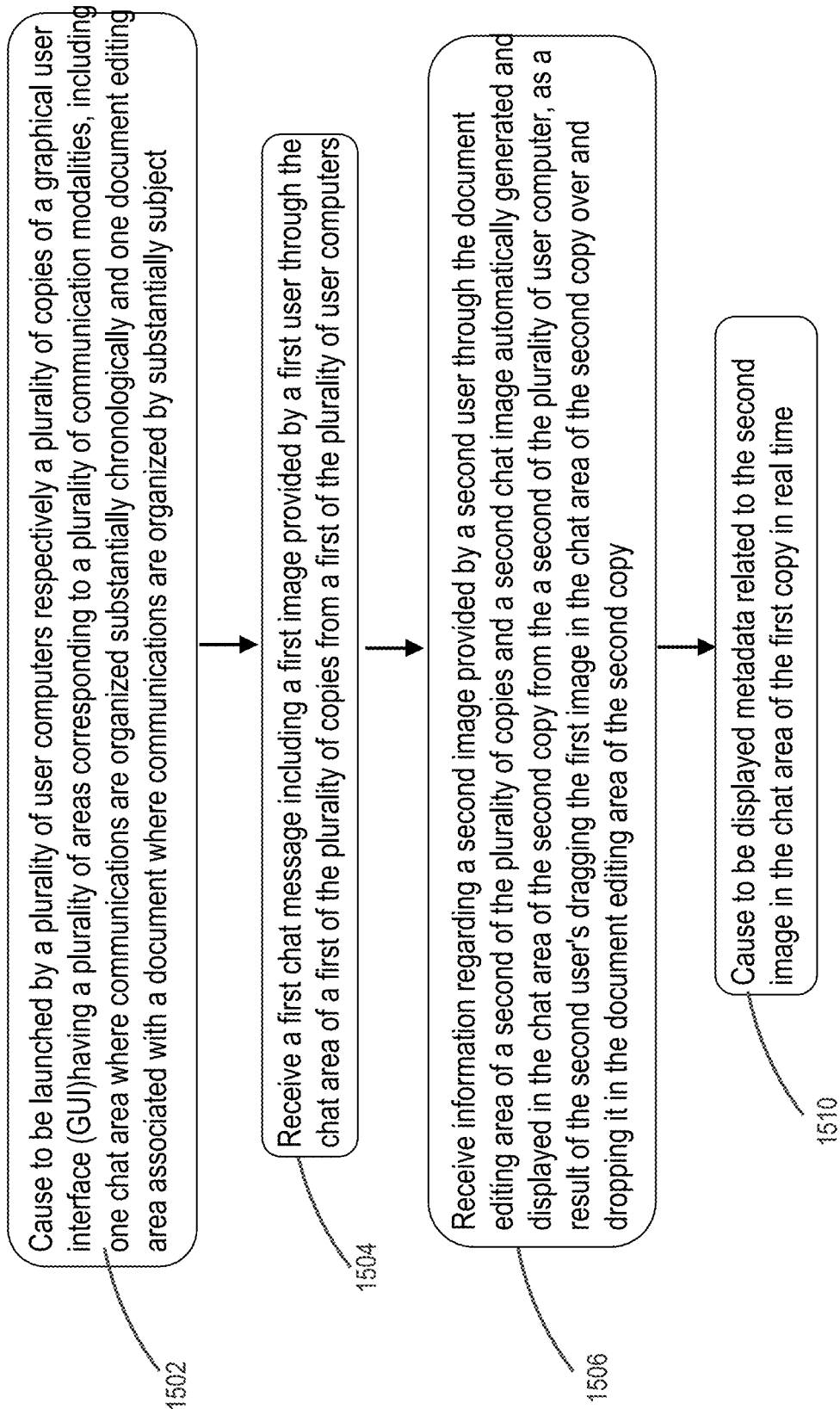
FIG. 15 illustrates an example process performed by the server of allowing a direct transfer of contents between different communication modalities in a multi-user, digital communication environment.
Figure 16:
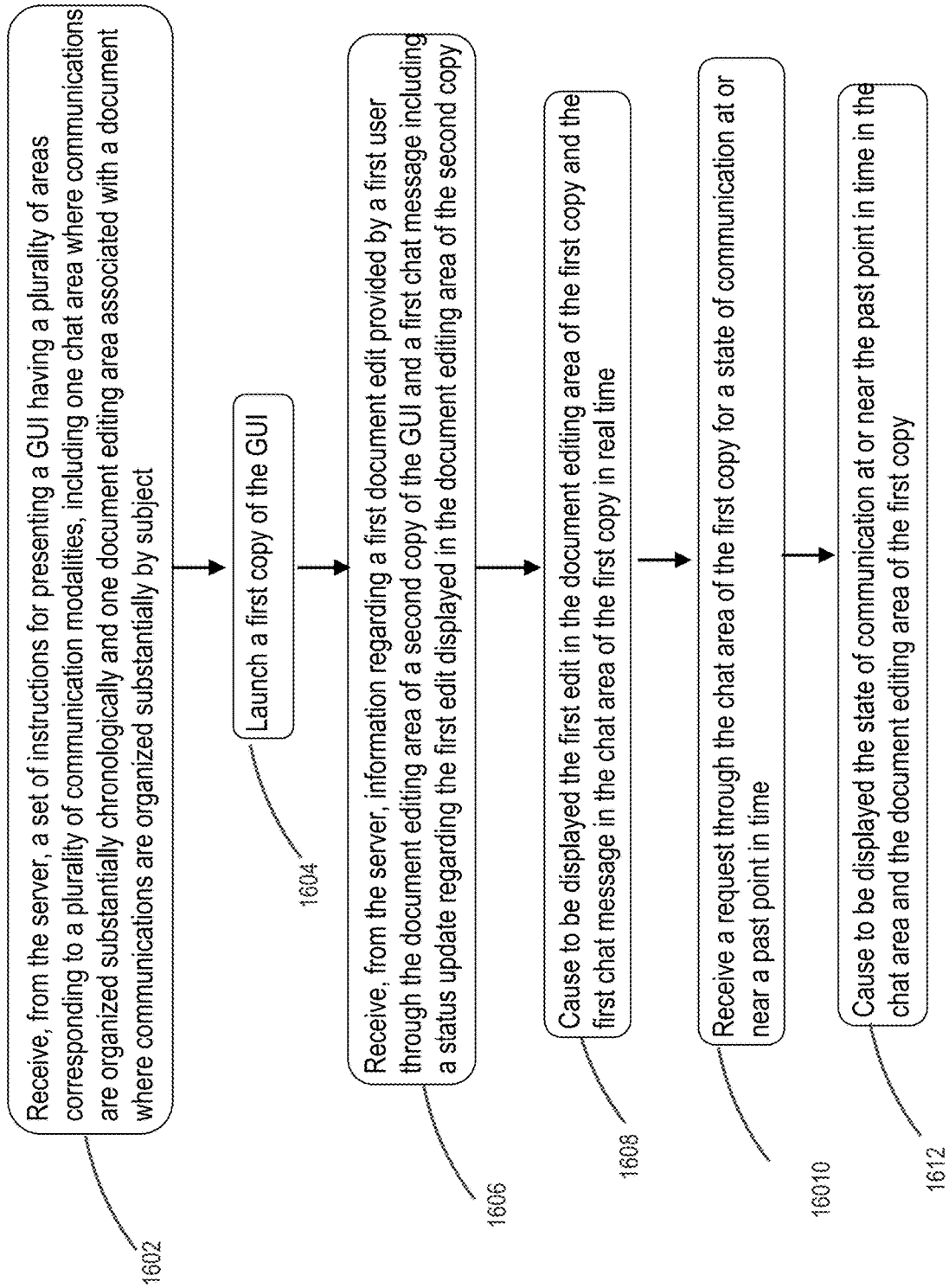
FIG. 16 illustrates an example process performed by a user computer of allowing a viewing of a specific state of communication in the multi-user, digital communication environment at a past point in time.

FIG. 15 and FIG. 16 are intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

FIG. 15 illustrates an example process performed by the server of allowing a direct transfer of contents between different communication modalities in a multi-user, digital communication environment. In some embodiments, the server 102 is programmed or configured to create a set of instructions for presenting a GUI for a multi-user, digital communication environment, and transmits the set of instructions to each of a plurality of user computers 122 over one or more communication networks. Each of the user computers 122 is then configured to launch a copy of the GUI in accordance with the set of instructions. In step 1502, the server 102 is thus configured to cause each of the user computers 122 to launch a copy of the GUI. The GUI can enable multiple communication modalities and presents multiple communication channels or areas corresponding to the multiple communication modalities. These multiple communication channels can include a chat area where communications, such as chat messages, are typically organized by time, and a document editing area where communications, such as document edits or comments, are typically organized by subject.

Subsequently, a first user computer 122a presenting a first copy of the GUI is configured to receive a first chat message including a first image inputted by a first user in the chat area of the first copy. In response, the first user computer 122a is programmed to transmit in real time information about the first chat message to the server 102 so that the occurrence of the first chat message can be duplicated by other user computers. In step 1504, the server 102 is thus configured to receive information regarding the first chat message including the first image provided by a first user through the chat area of the first copy of the GUI from the first user computer 122a. In response, the server 102 is programmed to transmit in real time at least some of the received information to a second user computer 122b presenting a second copy of the GUI. In response, the second user computer 122 is programmed to display the first chat message including the first image in the chat area of the second copy.

In response, the second user computer 122b is configured to detect an operation by a second user to transfer the first image from the chat area directly to the document editing area of the second copy, such as a drag-and-drop operation. In response, the second user computer 122b is configured to display a second image identical to the first image in the document editing area of the second copy. The second user computer 122 can also be programmed to generate and display a second chat message in the chat area of the second copy indicating that the operation was successful. Furthermore, the second user computer 122 is configured to transmit in real time information regarding the input and display of the second image and the generation and display of the second chat message to the server 102. In step 1506, the server 102 thus is configured to receive information regarding the second image provided by the second user through the document editing area of the second copy and the second chat message automatically generated and displayed from the second user computer 122b. In response, the server 102 is configured to transmit in real time at least some of the received information to the first user computer 122a.

In response, the first user computer 122a is configured to duplicate the occurrence of the second image and the second chat message in the first copy of the GUI, including displaying the second image in the document editing area and the second chat message in the chat area of the first copy. In step 1510, the server 102 is thus programmed to cause to be displayed metadata, such as an indicator that the second image was inserted into the document editing area 306 as a result of a drag-and-drag operation, in the chat area 308 of the first copy in real time.

FIG. 16 illustrates an example process performed by a user computer of allowing a viewing of a specific state of communication in the multi-user, digital communication environment at a past point in time. In some embodiments, the server 102 is programmed or configured to create a set of instructions for presenting a GUI for a multi-user, digital communication environment, and transmit the set of instructions to each of a plurality of user computers 122 over one or more communication networks. The GUI can enable multiple communication modalities and presents multiple communication channels or areas corresponding to the multiple communication modalities. These multiple communication channels can include a chat area where communications, such as chat messages, are typically organized by time, and a document editing area where communications, such as document edits or comments, are typically organized by subject. The server 102 is further configured to transmit the set of instructions to a plurality of user computers 122, including a first user computer 122a. In step 1602, the first user computer 122a is therefore programmed to receive, from the server 102, the set of instructions for presenting the GUI. In step 1604, the first computer 122a is further configured to launch a first copy of the GUI.

Subsequently, a second user computer 122b presenting a second copy of the GUI is configured to receive a first document edit inputted by a first user in the document editing area of the second copy. In response, the second user computer 122b can be programmed to display a first chat message including a status update regarding the document edit in the chat area of the second copy. The second user computer 122b is also programmed to transmit in real time information about the first document edit and the first chat message to the server 102 so that the input and display of the first document edit and the generation and display of the first chat message can be duplicated by other user computers. Subsequently, the server 102 is configured to receive information regarding the first edit provided by a first user through the document editing area of the second copy of the GUI and the first chat message from the second user computer 122b. In response, the server 102 is programmed to transmit in real time at least some of the received information to the first user computer 122a. In step 1606, the first computer 122a is thus configured to receive, from the server 102, information regarding the first edit provided by the first user through the document editing area of the second copy of the GUI a first chat message displayed in the document editing area of the second copy.

In response, in step 1608, the first user computer 122a is programmed to cause to be displayed the first document edit in the document editing area of the first copy and the first chat message in the chat area of the first copy.

Subsequently, a second user can submit a request through the first copy of the GUI, such as the chat area, to view the state of communication in the multi-user, digital communication environment at a past point in time. In step 1610, the first user computer 122a is thus programmed to receive the request through the chat area of the first copy specifying a past point in time.

In response, the first user computer 122a is configured to cause to be displayed a state of communication at or near the past point in time in the chat area and the document editing area of the first copy. If each user computer 122 relies on the server 102 to track the development of the chat stream or the document and manage different versions of the communication in the multi-user, digital communication environment, the first user computer 122a can be configured to send the request to the server 102 and receive sufficient information from the server 102 to be able to display the requested state of communication in the first copy of the GUI.

Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 17:
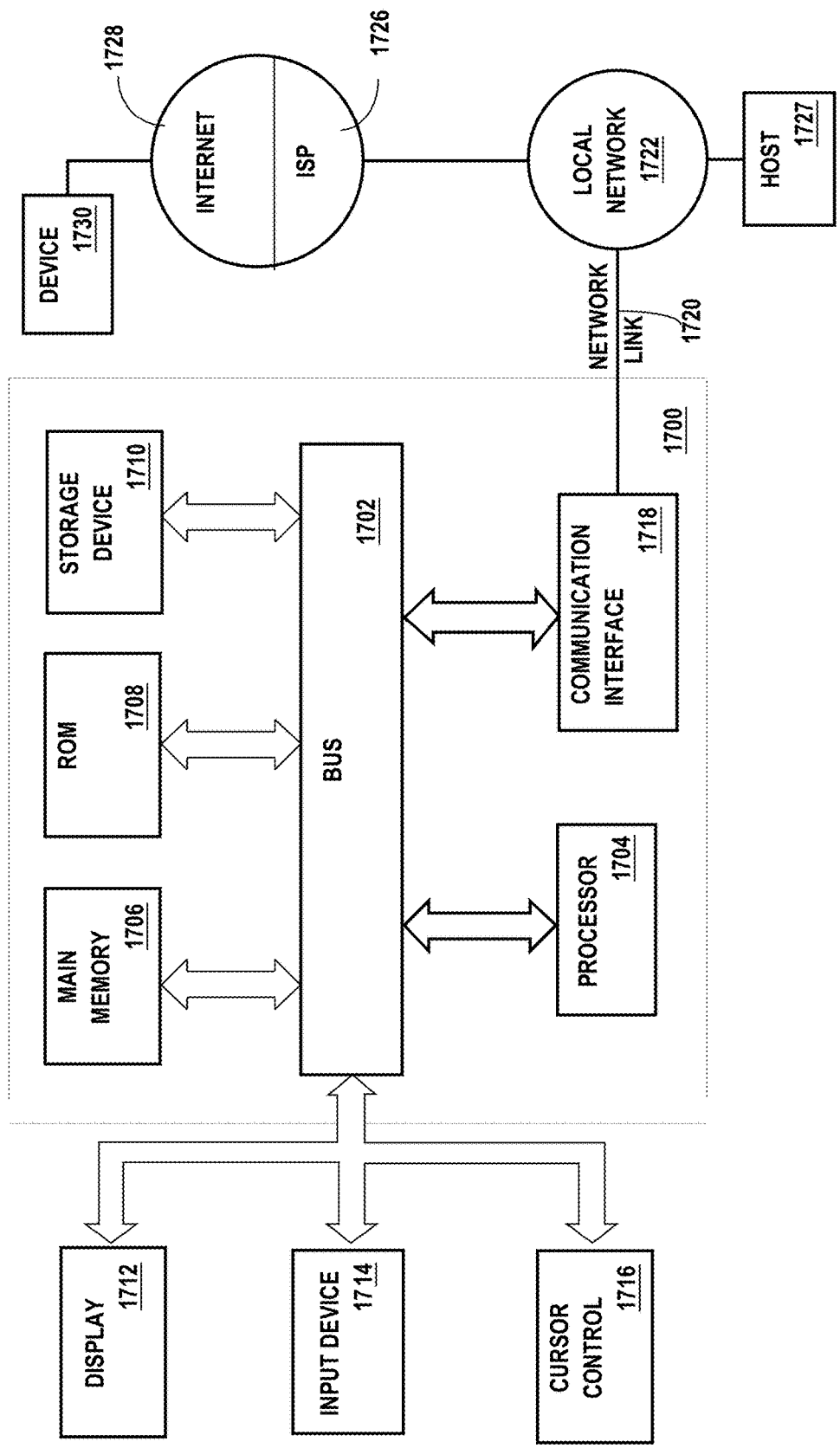
FIG. 17 is a block diagram that illustrates a computer system upon which an embodiment of the invention may be implemented.

For example, FIG. 17 is a block diagram that illustrates a computer system 1700 upon which an embodiment of the invention may be implemented. Computer system 1700 includes a bus 1702 or other communication mechanism for communicating information, and a hardware processor 1704 coupled with bus 1702 for processing information. Hardware processor 1704 may be, for example, a general purpose microprocessor.

Computer system 1700 also includes a main memory 1706, such as a random access memory (RAM) or other dynamic storage device, coupled to bus 1702 for storing information and instructions to be executed by processor 1704. Main memory 1706 also may be used for storing temporary variables or other intermediate information during execution of instructions to be executed by processor 1704. Such instructions, when stored in non-transitory storage media accessible to processor 1704, render computer system 1700 into a special-purpose machine that is customized to perform the operations specified in the instructions.

Computer system 1700 further includes a read only memory (ROM) 1708 or other static storage device coupled to bus 1702 for storing static information and instructions for processor 1704. A storage device 1710, such as a magnetic disk, optical disk, or solid-state drive is provided and coupled to bus 1702 for storing information and instructions.

Computer system 1700 may be coupled via bus 1702 to a display 1712, such as a cathode ray tube (CRT), for displaying information to a computer user. An input device 1714, including alphanumeric and other keys, is coupled to bus 1702 for communicating information and command selections to processor 1704. Another type of user input device is cursor control 1716, such as a mouse, a trackball, or cursor direction keys for communicating direction information and command selections to processor 1704 and for controlling cursor movement on display 1712. This input device typically has two degrees of freedom in two axes, a first axis (e.g., x) and a second axis (e.g., y), that allows the device to specify positions in a plane.

Computer system 1700 may implement the techniques described herein using customized hard-wired logic, one or more ASICs or FPGAs, firmware and/or program logic which in combination with the computer system causes or programs computer system 1700 to be a special-purpose machine. According to one embodiment, the techniques herein are performed by computer system 1700 in response to processor 1704 executing one or more sequences of one or more instructions contained in main memory 1706. Such instructions may be read into main memory 1706 from another storage medium, such as storage device 1710. Execution of the sequences of instructions contained in main memory 1706 causes processor 1704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1710. Volatile media includes dynamic memory, such as main memory 1706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1702. Transmission media can also take the form of acoustic or light waves, such as those generated during radio-wave and infra-red data communications.

Various forms of media may be involved in carrying one or more sequences of one or more instructions to processor 1704 for execution. For example, the instructions may initially be carried on a magnetic disk or solid-state drive of a remote computer. The remote computer can load the instructions into its dynamic memory and send the instructions over a telephone line using a modem. A modem local to computer system 1700 can receive the data on the telephone line and use an infra-red transmitter to convert the data to an infra-red signal. An infra-red detector can receive the data carried in the infra-red signal and appropriate circuitry can place the data on bus 1702. Bus 1702 carries the data to main memory 1706, from which processor 1704 retrieves and executes the instructions. The instructions received by main memory 1706 may optionally be stored on storage device 1710 either before or after execution by processor 1704.

Computer system 1700 also includes a communication interface 1718 coupled to bus 1702. Communication interface 1718 provides a two-way data communication coupling to a network link 1720 that is connected to a local network 1722. For example, communication interface 1718 may be an integrated services digital network (ISDN) card, cable modem, satellite modem, or a modem to provide a data communication connection to a corresponding type of telephone line. As another example, communication interface 1718 may be a local area network (LAN) card to provide a data communication connection to a compatible LAN. Wireless links may also be implemented. In any such implementation, communication interface 1718 sends and receives electrical, electromagnetic or optical signals that carry digital data streams representing various types of information.

Network link 1720 typically provides data communication through one or more networks to other data devices. For example, network link 1720 may provide a connection through local network 1722 to a host computer 1727 or to data equipment operated by an Internet Service Provider (ISP) 1726. ISP 1726 in turn provides data communication services through the world wide packet data communication network now commonly referred to as the "Internet" 1728. Local network 1722 and Internet 1728 both use electrical, electromagnetic or optical signals that carry digital data streams. The signals through the various networks and the signals on network link 1720 and through communication interface 1718, which carry the digital data to and from computer system 1700, are example forms of transmission media.

Computer system 1700 can send messages and receive data, including program code, through the network(s), network link 1720 and communication interface 1718. In the Internet example, a device 1730 might transmit a requested code for an application program through Internet 1728, ISP 1726, local network 1722 and communication interface 1718.

The received code may be executed by processor 1704 as it is received, and/or stored in storage device 1710, or other non-volatile storage for later execution.

Other Aspects of Disclosure

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A method comprising:

causing, by a processor of a server, to be launched by a plurality of user computers a respective plurality of copies of a graphical user interface (GUI), wherein a first copy of the plurality of copies is presented by a first user computer of the plurality of user computers, and wherein the GUI comprises a plurality of areas corresponding to a plurality of communication modalities, the plurality of areas comprising a chat area where communications including back-and-forth chats are organized substantially chronologically and a document editing area associated with a document where communications are organized substantially by subject;

receiving, by the processor, a first item provided by a first user through the document editing area of the first copy from the first user computer of the plurality of user computers over a first communication network;

causing to be displayed in real time metadata related to the first item in the chat area of each of the plurality of copies of the GUI;

causing a chat message to be generated for each edit or comment made to the first item and to be displayed in the chat area; and causing, upon selection of the chat message in the chat area, a corresponding edit or comment in the first item in the document editing area from a user instruction in the chat message for the corresponding edit or comment and displaying indicators in both the document editing area and the chat area indicating that the corresponding edit or comment has been incorporated in the first item, wherein causing the corresponding edit or comment in the first item in the document editing area further comprises:

predicting further edit or comment related to the corresponding edit or comment in the first item in the document editing area, providing another chat message, in the chat area, for an approval from the first user to cause the predicted further edit or comment to be included in the first item in the document editing area, and displaying a status update of the approval in the chat area.

2. The method of claim 1, wherein the first item comprises an image or a video.

3. The method of claim 1, wherein displaying the metadata comprises displaying the metadata in response to an addition to, a deletion from, an update of, or a comment on the document.

4. The method of claim 1, wherein the metadata comprises an identifier of the first item, a time when the first item was received, a size of the first item, or an identifier of the first user.

5. The method of claim 1, further comprising:
determining whether the first user has permission to edit the document,
incorporating, when the first user has permission, the first item into the document, the metadata including an indication of the permission.

6. The method of claim 1, further comprising:
causing to be displayed an indicator in the document editing area of the first copy that the first item is pending approval, the metadata including a request for approval of the first item.

7. The method of claim 6, further comprising:
receiving an approval of the first item through the chat area of a second of the plurality of copies from a second of the plurality of computers over a second communication network;
causing to be updated or removed the indicator from the document editing area of the first copy in response to the approval.

8. The method of claim 1, further comprising:
receiving a second item provided by a second user through the chat area of a second of the plurality of copies from a second of the plurality of user computers over a second communication network,
the first item being received as a result of an operation by the first user to duplicate the second item from the chat area into the document area of the first copy.

9. The method of claim 1, further comprising:
receiving a request through the chat area of a second of the plurality of copies from a second of the plurality of user computers specifying a past point in time through the chat area;
causing to be displayed in the chat area and the document editing area of the second copy a state of communication at or near the past point in time.

10. The method of claim 9, further comprising:
causing to be displayed a first indicator in the chat area of the second copy of an option to view the state of communication at the past point in time, the first indicator being associated with a communication occurring at or near the past point in time and displayed in the chat area of the second copy; the request being received via a selection of the first indicator.

11. The method of claim 10, the communication including the metadata, further comprising:
causing to be displayed a second indicator in the document editing area of the second copy that the first item corresponds to the communication, the second indicator being associated with the first item displayed in the document editing area of the second copy, the second indicator being displayed in response to the selection of the first indicator.

12. A method comprising:
receiving, by a processor, a set of instructions from a remote server over a communication network for presenting a graphical user interface (GUI), the GUI comprising a plurality of areas corresponding to a plurality of digital communication modalities for communication among a plurality of user computers, including one chat area where communications including back-and-forth chats are organized substantially chronologically and one document editing area associated with a document where communications are organized substantially by subject;
launching a first copy of the GUI in accordance with the set of instructions;
receiving, by the processor, a first item through the document editing area;
causing to be displayed in real time metadata related to the first item in the chat area of the first copy and other launched copies of the GUI;
causing a chat message to be generated for each edit or comment made to the first item and to be displayed in the chat area; and
causing, upon selection of the chat message in the chat area, a corresponding edit or comment in the first item in the document editing area from a user instruction in the chat message for the corresponding edit or comment and displaying indicators in both the document editing area and the chat area indicating that the corresponding edit or comment has been incorporated in the first item, wherein causing the corresponding edit or comment in the first item in the document editing area further comprises:
predicting edit or comment related to the corresponding edit or comment in the first item in the document editing area,
providing another chat message, in the chat area, for an approval from the first user to cause the predicted further edit or comment to be included in the first item in the document editing area, and
displaying a status update of the approval in the chat area.

13. The method of claim 12, wherein the first item comprises an image or a video.

14. The method of claim 12, wherein the first item corresponds to an addition to, a deletion from, an update of, or a comment on the document.

15. The method of claim 12, wherein the metadata comprises an identifier of the first item, a time when the first item was received, a size of the first item, or an identifier of the first user.

16. The method of claim 12, further comprising:
determining whether the first user has permission to edit the first item,
causing, when the first user has permission, the first item to be displayed in the document area, the metadata including an indication of the permission.

17. The method of claim 12, further comprising:
causing to be displayed an indicator in the document editing area that the first item is pending approval, the metadata including a request for approval of the first item.

18. The method of claim 17, further comprising:
receiving an approval of the first item from the remote server;
causing to be updated or removed the indicator from the document editing area in response to the approval.

19. The method of claim 12, further comprising:
causing to be displayed a second item in the chat area;
receiving an instruction to duplicate the second item directly from the chat area into the document area;
the first item being received as a result of the instruction.

20. The method of claim 12, further comprising:
receiving a request through the chat area specifying a past point in time;
causing to be displayed in the chat area and the document editing area a state of communication at or near the past point in time.

21. The method of claim 20, further comprising:
causing to be displayed a first indicator in the chat area of an option to view the state of communication at the past point in time,
the first indicator being associated with a communication occurring at or near the past point in time and displayed in the chat area;
the request being received via a selection of the first indicator.

22. The method of claim 21, the communication including the metadata, further comprising:
causing to be displayed a second indicator in the document editing area that the first item corresponds to the communication, the second indicator being associated with the first item displayed in the document editing area, the second indicator being displayed in response to the selection of the first indicator.

23. The method of claim 12, further comprising:
generating a summary of the first item; the metadata being the summary.

24. The method of claim 12, further comprising:
determining an approach to implement an edit to the document from one or more of communications in the chat area;
causing to be displayed in the chat area of each copy a suggestion of the approach.

25. A non-transitory computer readable medium having instructions which when executed perform a method comprising:
causing to be launched by a plurality of user computers a respective plurality of copies of a graphical user interface (GUI), wherein a first copy of the plurality of copies is presented by a first user computer of the plurality of user computers, and wherein the GUI comprises a plurality of areas corresponding to a plurality of communication modalities, the plurality of areas comprising a chat area where communications including back-and-forth chats are organized substantially chronologically and a document editing area associated with a document where communications are organized substantially by subject;
receiving a first item provided by a first user through the document editing area of the first copy from the first user computer of the plurality of user computers over a first communication network;
causing to be displayed in real time metadata related to the first item in the chat area of each of the plurality of copies of the GUI;
causing a chat message to be generated for each edit or comment made to the first item and to be displayed in the chat area; and
causing, upon selection of the chat message in the chat area, a corresponding edit or comment in the first item in the document editing area from a user instruction in the chat message for the corresponding edit or comment and displaying indicators in both the document editing area and the chat area indicating that the corresponding edit or comment has been incorporated in the first item, wherein causing the corresponding edit or comment in the first item in the document editing area further comprises:
predicting further edit or comment related to the corresponding edit or comment in the first item in the document editing area,
providing another chat message, in the chat area, for an approval from the first user to cause the predicted further edit or comment to be included in the first item in the document editing area, and
displaying a status update of the approval in the chat area.

* * * * *